(12) United States Patent
Marsland, Jr. et al.

(10) Patent No.: US 8,204,378 B1
(45) Date of Patent: Jun. 19, 2012

(54) COHERENT OPTICAL SIGNAL PROCESSING

(75) Inventors: Robert A. Marsland, Jr., Madison, WI (US); Christophe J. Dorrer, Rochester, NY (US)

(73) Assignee: Tektronix, Inc., Beaverton, OR (US)

( * ) Notice: Subject to any disclaimer, the term of this patent is extended or adjusted under 35 U.S.C. 154(b) by 411 days.

(21) Appl. No.: 12/409,030

(22) Filed: Mar. 23, 2009

Related U.S. Application Data

(60) Provisional application No. 61/039,952, filed on Mar. 27, 2008, provisional application No. 61/105,750, filed on Oct. 15, 2008.

(51) Int. Cl.
*H04J 14/06* (2006.01)
*H04B 10/06* (2006.01)
*H04B 10/00* (2006.01)

(52) U.S. Cl. .......................... 398/65; 398/205; 398/152

(58) Field of Classification Search .................. 398/43, 398/65, 140, 152, 184, 205, 206
See application file for complete search history.

(56) References Cited

U.S. PATENT DOCUMENTS

| | | |
|---|---|---|
| 3,214,590 A | 10/1965 | Schactman |
| 3,571,597 A | 3/1971 | Wood et al. |
| 3,822,942 A | 7/1974 | Hock |
| 3,971,930 A | 7/1976 | Fitzmaurice et al. |
| 4,718,120 A | 1/1988 | Tzeng |
| 4,718,121 A | 1/1988 | Epworth |
| 4,965,858 A | 10/1990 | Naito et al. |
| 4,984,297 A | 1/1991 | Manome |
| 5,027,436 A | 6/1991 | Delavaux |
| 5,060,312 A | 10/1991 | Delavaux |
| 5,115,332 A | 5/1992 | Naito et al. |
| 6,212,008 B1 | 4/2001 | Xie et al. |
| 6,798,994 B1 | 9/2004 | Tsao et al. |
| 7,042,629 B2 | 5/2006 | Doerr et al. |
| 7,209,670 B2 | 4/2007 | Fludger et al. |
| 7,269,228 B2 | 9/2007 | Shiung |
| 7,272,271 B2 | 9/2007 | Kaplan et al. |
| 7,315,584 B1 | 1/2008 | Epworth et al. |
| 7,346,279 B1 | 3/2008 | Li et al. |
| 7,397,979 B2 | 7/2008 | Shpantzer et al. |
| 7,769,305 B1 * | 8/2010 | Roberts et al. ................ 398/206 |

OTHER PUBLICATIONS

R. Langenhorst et al., "Balanced phase and polarization diversity coherent optical receiver," IEEE Photonics Technology. Letters, vol. 3, No. 1 pp. 80-82 Jan. 1991 (3 pgs).
C. Dorrer et al., "Linear Optical Sampling," IEEE Photonics Technology. Letters, vol. 15, No. 12 pp. 1746-1748 Dec. 2003 (3 pgs).

(Continued)

*Primary Examiner* — Jack Dinh
(74) *Attorney, Agent, or Firm* — C. Thomas Sylke; Sylke Law Offices, LLC

(57) ABSTRACT

Coherent optical signal processing is performed in a coherent receiver (or diagnostic/testing apparatus) that converts an amplitude and/or angle-modulated optical signal into two electrical signals. A simple receiver can only detect one phase of the signal and only the polarization that is aligned with a local oscillator laser polarization. To detect both phases and both polarizations, two sets of two interferometers, one each with a π/2 phase shift are required. Coherent optical signal processing methods, apparatus, techniques, etc. are disclosed that include individual components comprising a polarization combiner, a Savart device and photodetection apparatus with substantially reduced temperature and alignment sensitivity operating in optical communication systems and/or subsystems. The various embodiments can be used alone or in such combinations to provide improved coherent optical signal processing in a receiver.

17 Claims, 19 Drawing Sheets

OTHER PUBLICATIONS

P. Hobbs, Building Electro-Optical Systems: Making it all Work, Wiley Interscience, pp. 331-32 2000 (2 pgs).

Tzeng et al, "Measurement of excess sensitivity penalty of a four-diode polarization diversity coherent receiver," Electronics Letters, vol. 24, No. 6, 17 Mar. 1988, pp. 330-332 (3 pgs).

R. Langenhorst et al., "Compact bulk optical 90 degrees hybrid for balanced phase diversity receivers," Electronics Letters, vol. 25, No. 22, pp. 1518-1519 Oct. 26, 1989 (2 pgs).

Photop—Global Manufacturing Partner, "Single Mode Dual Fiber Collimator," 2007 Rev. A (2 pgs).

R. Garreis, "90 ° optical hybrid for coherent receivers," SPIE vol. 1522 Optical Space Communication II, 1991 (10 pgs).

J. Courtial et al., "Design of a static Fourier-transform spectrometer with increased field of view," Applied Optics, vol. 35, No. 34, Dec. 1, 1996, pp. 6698-702 (5 pgs).

M. Luet et al., "P-58: Imaging Polarization Interferometer for flat panel display characterization," SID Symposium Digest of Technical Papers, May 2004, vol. 35, issue 1, pp. 466-469 (4 pgs).

A. Weijers et al., "Polarization phase stepping with a Savart element," Applied Optics, vol. 37, No. 22, Aug. 1, 1998, pp. 5150-5155 (6 pgs).

* cited by examiner

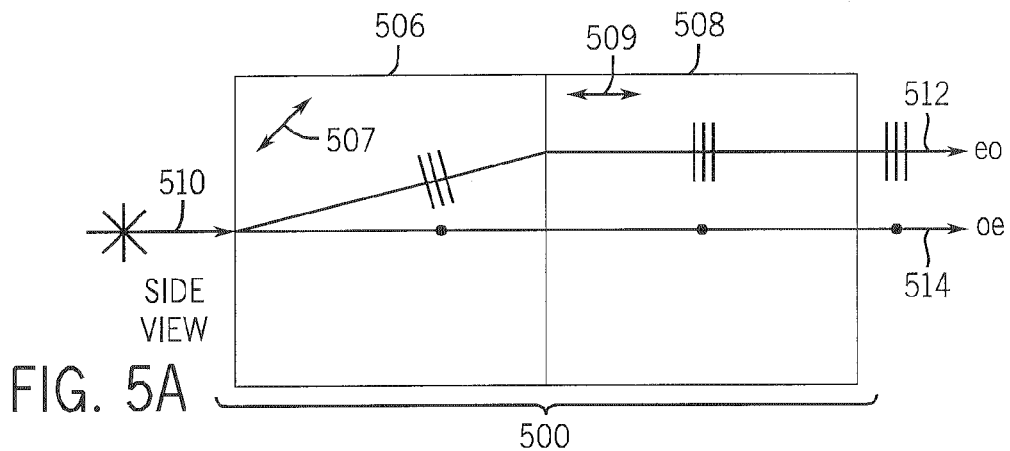
FIG. 5A
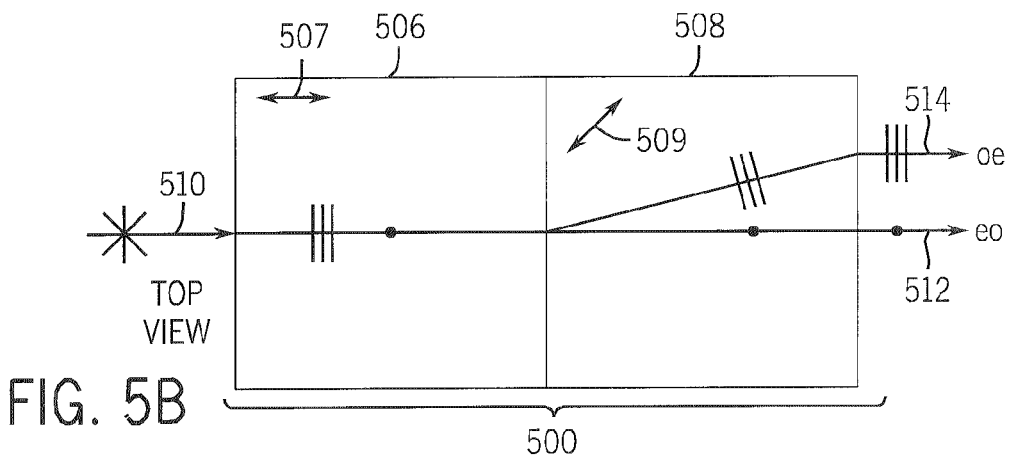
FIG. 5B
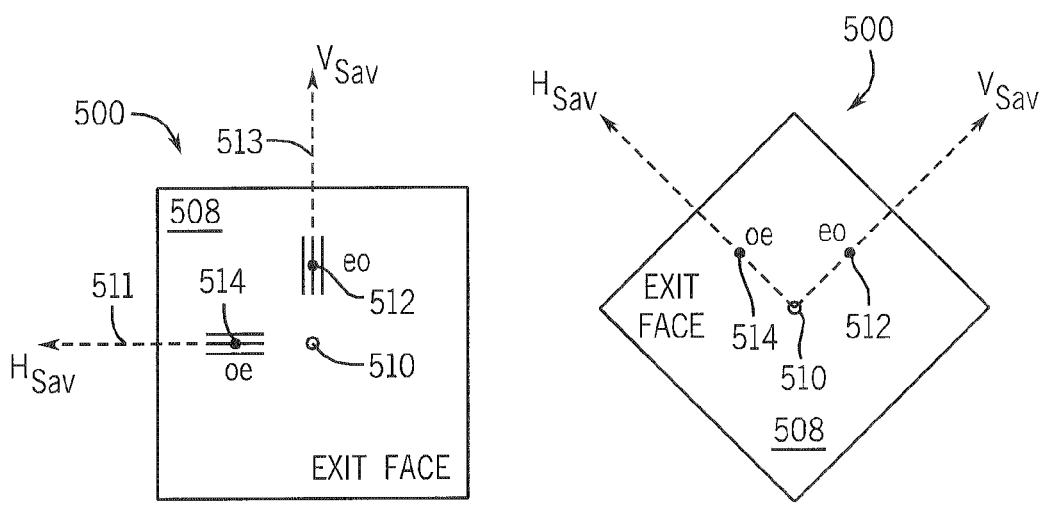
FIG. 5C
FIG. 5D

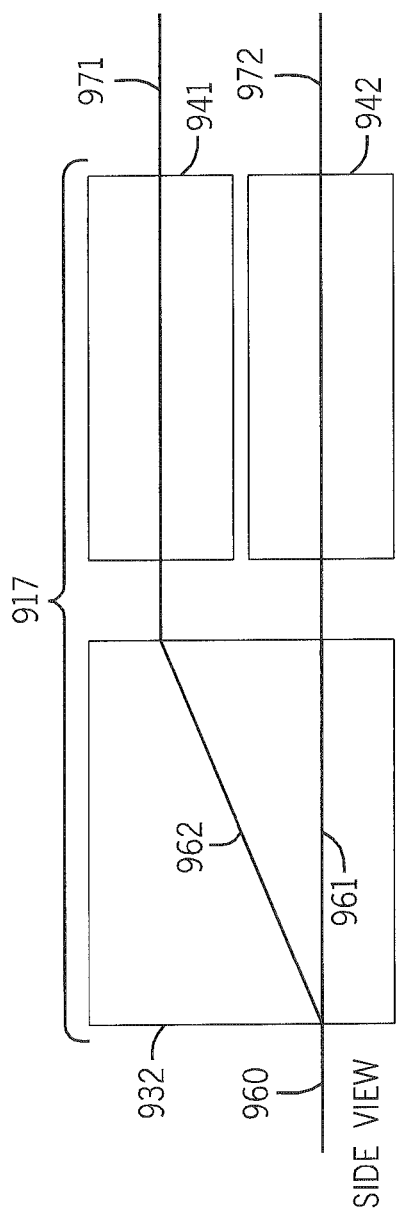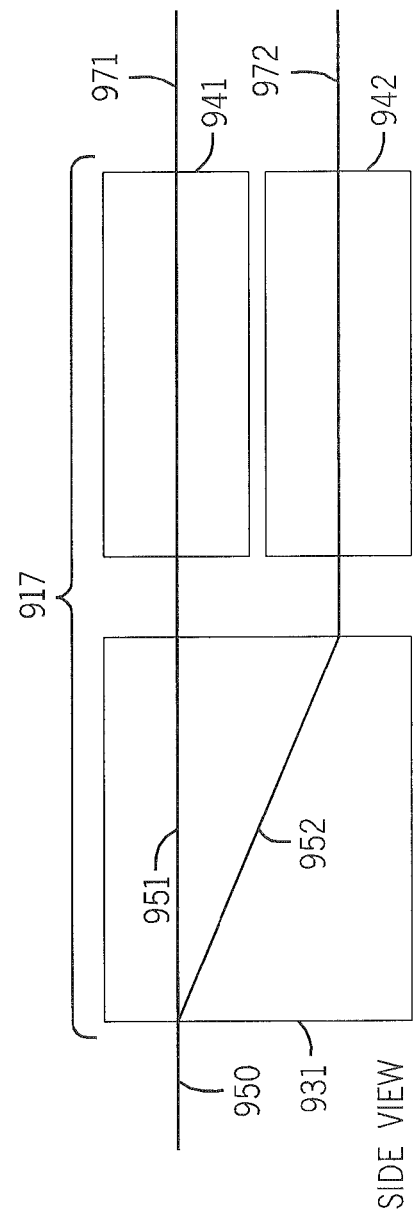

COHERENT OPTICAL SIGNAL PROCESSING

CROSS-REFERENCE TO RELATED APPLICATIONS

This application claims the benefit of priority under 35 U.S.C. §119(e) of the following:

U.S. Provisional No. 61/039,952 filed on Mar. 27, 2008, entitled LOW-COMPONENT-COUNT COHERENT RECEIVER, the entire disclosure of which is incorporated herein by reference in its entirety for all purposes; and U.S. Provisional No. 61/105,750 filed on Oct. 15, 2008, entitled COHERENT OPTICAL SIGNAL PROCESSING, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

The present invention relates generally to optical communication and/or data transmission systems.

2. Description of Related Art

Optical communication systems transmit data using electromagnetic light signals in optical fiber and/or free space (for example, building to building, ground to satellite, satellite to satellite, etc.). The electromagnetic carrier wave is modulated to carry the data. Optical communication in optical fiber typically involves: generating the optical signal, relaying the signal on an optical fiber (including measures to reduce/mitigate attenuation of, interference with and/or distortion of the light signal), processing a received optical signal, and converting the signal into a useful electrical signal. Transmitters can be semiconductor devices such as laser diodes, producing coherent light for transmission. A number of receivers have been developed for processing a transmitted lightwave optical signal to provide processed optical signal input(s) to one or more photodetectors, which convert light into electricity.

A coherent receiver converts a modulated optical signal into four electrical signals corresponding to the "in-phase" (I) and "quadrature" (Q) optical signal components of the two optical polarization states, which together carry all or nearly all of the information conveyed by the optical signal. These components can be processed to recover the optically transmitted data regardless of modulation type. A simple coherent receiver is composed of a local-oscillator laser, an optical coupler, and one or more photodetectors that can be in a "balanced" configuration that cancels photocurrents and eliminates DC terms and the related excess intensity noise.

Systems, methods and techniques that provide improved ways to process optical signals in an optical communication systems, including signals used for testing, analysis, diagnostic uses and as a receiver in a more general sense would represent a significant advancement in the art.

SUMMARY OF THE INVENTION

Various embodiments of coherent optical signal processing methods, apparatus, techniques, etc. are disclosed. These embodiments include individual components as well as combinations of components operating as systems and/or subsystems. The various embodiments can be used alone or in such combinations to provide improved coherent optical signal processing in a receiver. The compact nature of some embodiments of the present invention also makes these embodiments ideal not only as receivers in optical communication systems, but also as diagnostic and/or testing equipment that can be use in a wide variety of settings and environments.

Polarization-multiplexing splits an input signal into two polarizations that are simultaneously polarization-multiplexed with a local oscillator input. Each polarization-multiplexing output beam has a signal polarization and an orthogonal local oscillator polarization. The signal and local oscillator therefore travel a common path, removing any constraints requiring optical path length control at the optical wavelength level. Novel and non-obvious embodiments of a polarization combiner disclosed and claimed herein include four birefringent crystals (or plates) that generate two parallel and precisely spaced output beams. This eliminates beams emerging at 90° (as occurs with polarizing beam splitting (PBS) cubes) and the requirement of a set of turning mirrors that add six initial (and possibly future) adjustments and additional manufacturing cost. The input beam alignment tolerance of the polarization combiner is the same as with a PBS cube, but mirrors are eliminated. Embodiments of the polarization combiner permit a simple stacking of precisely fabricated optics (rather than precise alignment of angular beams) to split and recombine input beams, such as local oscillator and unprocessed signal beams, to generate polarization-multiplexed beams for use in differential detection. The entire polarization combiner assembly can be rotated 45° to provide horizontal or vertically oriented multiplexed beams. Input beams for the polarization combiner can be supplied using a collimator that provides additional advantages. One or more collimators can be used in connection with various embodiments disclosed and claimed herein, as described in more detail below and in the Figures.

Beams used in differential detection are composed of interferometer terms for each polarization. A common path interferometer is advantageous in removing common-mode noise such as fluctuation in the total path length due to temperature variation (two outputs of a beam splitter create a balanced signal that can be detected with a balanced photodiode/receiver arrangement). Novel and non-obvious embodiments of a Savart device disclosed and claimed herein use two birefringent crystals (or plates) with optic axes oriented at 90° with respect to each other to equalize path length and generate the needed differential beams. This eliminates PBS cubes and other earlier devices that introduce difficult path-length matching of cube outputs that emerge at 90° angles and require optical elements to steer them back to the balanced detectors (a half-wave waveplate also is needed to keep the beams in the plane of the apparatus). The Savart device (also referred to as a Savart polariscope or Savart plate) generates two output beams both displaced laterally in two orthogonal directions from their input beam. Rotation of the Savart device by 45° eliminates the waveplate while maintaining horizontal beam separation, which is advantageous for vertically multiplexed beams if the goal is a square pattern. A benefit of the Savart device as a polarizer in a receiver is that spurious noise from optical reflections is eliminated. Moreover, a pair of input beams can be processed into four Savart device output beams for imaging onto a specialized photodetector array that utilizes close orientation of photodiodes for balanced detection.

Detection techniques and apparatus include novel and non-obvious embodiments in which photodiodes are incorporated into the optical assembly (for example, mounted to a chip, die, substrate or the like), thus removing intervening fiber connections and eliminating excess optical loss that otherwise occurs. In some embodiments, the photodiodes are included in the optical assembly, providing an additional degree of freedom since the detectors need not be designed for fiber coupling and allowing many more detectors and amplifiers to be incorporated onto one chip. Earlier coherent receiver designs required separate optical and detector assemblies, necessitating coupling in and out of single-mode fiber and resulting in a minimum of 0.2-dB of additional optical loss at each fiber interface due to the difficulty of perfectly mode-matching and anti-reflection-coating the fiber. Also, each of these earlier system fiber couplings added substantial cost due to ruggedizing the connection. Cost was multiplied when more high-frequency packages were required. Earlier system separation of the detector/receiver assembly from the optics also led to imperfect path matching, impacting noise rejection provided by balanced detection. A 30-dB rejection ratio requires amplitude response matching to 3% and path length matching to <1% of the symbol period (<1 ps for 10 Gbaud), matching nearly impossible with a separately packaged detector/receiver.

Using embodiments of the detection apparatus, beams can be simply imaged onto detectors arranged in any pattern that is convenient for the optical assembly and electrical design. Another advantage of imaging onto detectors is that detector spacing can be quite close, thereby reducing stray capacitance when detectors are coupled together to provide a balanced output. This is done while maintaining practical beam separation in the optics. In addition to reducing cost and optical loss, including detectors in the optical assembly and using telescopic imaging for photodiode coupling relaxes alignment tolerances by the telescope magnification. Unlike optical fiber, a photodiode is effective at receiving light from almost any angle in $2\pi$ steradians (earlier coherent receiver optical assemblies needed alignment at the output plane to a fraction of the fiber core diameter and a fraction of the acceptance angle). Embodiments of the new detection apparatus require alignment to about 50 microns.

In one specific embodiment, detectors are arranged in a square pattern to allow four beams to be readily imaged onto the detectors with a simple telescopic lens arrangement. The square pattern minimizes the lens clear-aperture needed and the detector die-size and simplifies access to the two outputs of the two pairs of diodes with outputs on opposite sides of the chip. Integrating the four detectors onto one chip provides precisely controllable detector locations that can be coupled to the optics without individual manipulation of each detector's coupling.

Novel and non-obvious embodiments of coherent receivers and receiving systems incorporate one or more of the embodiments of a polarization combiner, Savart device and/or photodetection apparatus. Such systems can be used as receivers or as testing equipment for optical communication systems.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which:

FIG. 5A is a side view of a Savart device.

FIG. 5B is a top view of the Savart device of FIG. 5A.

FIG. 5C is an end view of the exit face of the Savart device of FIGS. 5A and 5B.

FIG. 5D is an end view of the exit face of the Savart device of FIG. 5C tilted 45°.

FIG. 9B is a side view of the polarization combiner of FIG. 9A, taken along a cross-sectional vertical plane through birefringent crystal 932.

FIG. 9C is a side view of the polarization combiner of FIG. 9A, taken along a cross-sectional vertical plane through birefringent crystal 931.

DETAILED DESCRIPTION

The following detailed description will refer to one or more embodiments, but the present invention is not limited to such embodiments. Rather, the detailed description and any embodiment(s) presented are intended only to be illustrative. Those skilled in the art will readily appreciate that the detailed description given herein with respect to the Figures is provided for explanatory purposes as the invention extends beyond these limited embodiments.

Certain terms are used throughout the description and claims to refer to particular system components. In the following discussion and in the claims, the terms "including" and "comprising" are used in an open-ended fashion, and thus should be interpreted to mean "including, but not limited to . . . " Phrases such as "coupled to" and "connected to" and the like are used herein to describe a connection between two devices, elements and/or components and are intended (unless otherwise restricted specifically) to mean physically, optically and/or electrically either coupled directly together, or coupled indirectly together, for example via one or more intervening elements or components or via a wireless or other connection, where appropriate. The term "system" refers broadly to a collection of two or more components and may be used to refer to an overall system (e.g., a communication system, a receiving system, a testing system, a computer system or a network of such devices/systems), a subsystem provided as part of a larger system, and/or a process or method pertaining to operation of such a system or subsystem.

Figure 1:
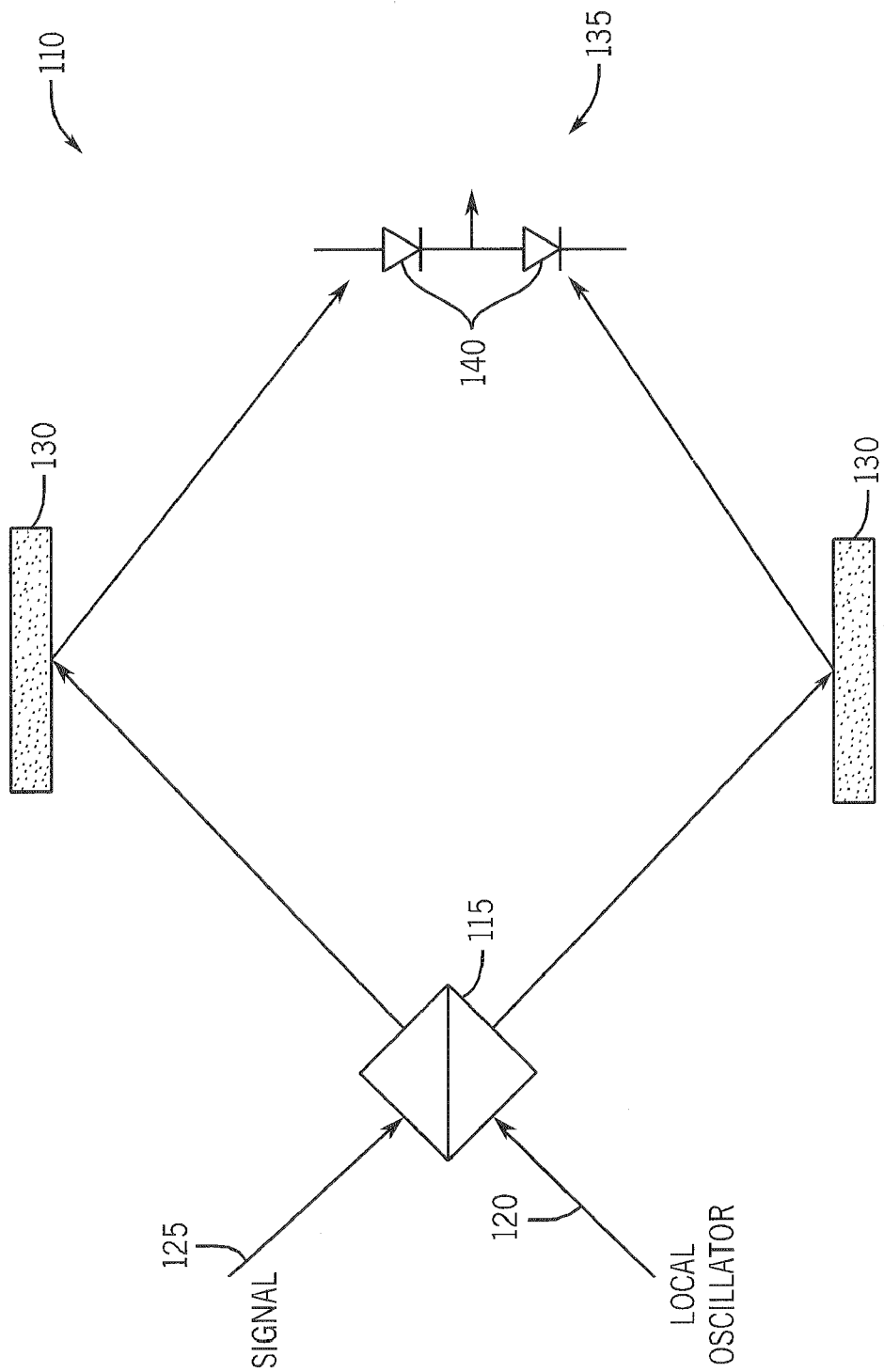
FIGS. 1, 2 and 3A are plan views of one or more coherent optical signal processing systems.

As seen in FIG. 1, a generalized optical signal processor 110 (which can be used as an optical signal receiver or an optical testing device, for example) can use a simple non-polarizing beam splitter cube 115 to combine a local oscillator laser beam 120 with an unprocessed data signal beam 125. The laser used for the local oscillator can be any suitable laser source and type (for example, continuous wave, pulsed, etc.). As noted below in connection with the use of polarization components of the local oscillator, and as will be appreciated by those skilled in the art, the local oscillator should be oriented so that sufficient reference local oscillator power is available downstream along any needed polarizations. In some embodiments discussed herein, such polarizations may be referred to as "horizontal" and "vertical" polarizations (as well as other orientation representations such as x-axis and y-axis, etc.), though such nomenclature only serves to describe the relative polarization orientations, as do references to 45° offsets and/or axes relative to such horizontal and/or vertical polarization orientations. Those skilled in the art will appreciate that many equivalent structures, apparatus, etc. are available once the relative polarization schemes, etc. are known.

This single polarization, single phase coherent receiver 110 uses a pair of mirrors 130 to direct the output of the beam splitter cube 115 to a photodetector apparatus 135 that typically comprises a pair of photodetectors such as photodiodes 140 coupled to an amplifier and/or other components well known to those skilled in the art and used to extract data from the signal beam 125.

However, this simple receiver 110 can only detect one component (for example, the in-phase component) of the unprocessed data signal beam 125 along the polarization state of the local oscillator. Detection of the another component (for example, the quadrature component) along the same polarization state requires a second, nearly duplicate interferometer/photodetector apparatus similar to that in FIG. 1, plus a π/2 (that is, 90°) phase shift between the interfering fields. Separate detection of the second phase is called "phase diversity." The two components of the signal along another polarization state (for example, a polarization state perpendicular to the state detected in FIG. 1) must be measured in order to describe an optical signal fully.

Figure 2:
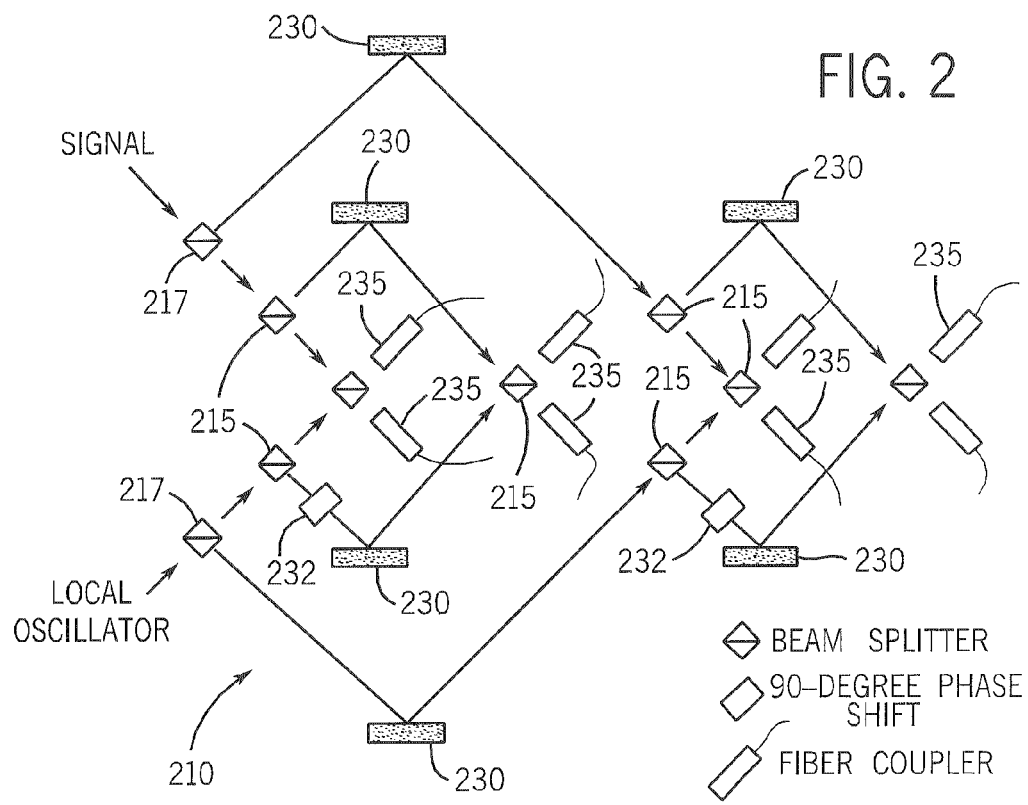

To achieve this full signal description, earlier systems simply doubled all of the receiver components, adding a polarization splitter in front of the structure to direct a first polarization to one receiver and a second, orthogonal polarization to a second receiver. Separate detection of the second polarization is called "polarization diversity." While this type of phase-diverse and polarization-diverse system works satisfactorily, it typically quadruples the system's complexity and cost. An example of such an earlier system 210 is shown in FIG. 2, which uses a number of non-polarizing beam splitter cubes 215, a single polarizing beam splitter cube 217, a number of mirrors 230, π/2 (90°) phase shifters 232, and fiber couplers 235, which typically are connected to photodetectors (unlike some embodiments of the present invention, optical components in such earlier systems did not couple directly to photodetectors, but instead used separate fiber coupled receivers).

Earlier balanced phase and polarization diversity coherent optical receivers (for example, the compact bulk optical 90° hybrid and/or balanced phase and polarization diversity receiver previously proposed and described by Langenhorst et al.) can provide some component reuse. However, such systems cannot provide reliable path length matching of the balanced signal beams, which is critical in realizing the benefits of common-mode noise rejection in balanced detection.

Moreover, the prevalence of beam splitter cubes, both non-polarizing and polarizing, in such earlier systems, leads to two-dimensional "spreading" of the system. That is, each beam splitter cube has at least two outputs that emerge from a cube at a 90° orientation. This characteristic makes such systems "wider" and requires the use of mirrors and other components that require precise positioning and adjustments to maintain a suitable precise and accurate system. Embodiments of coherent optical signal processing systems and components disclosed and claimed herein include one or more "linear optical components," which are defined to be components in which the input beam(s) and output beam(s) are generally parallel (for example, the polarization combiner and Savart devices described in more detail below). As will be appreciated by those skilled in the art, such linear optical components reduce the "width" and "spread" of a coherent optical signal processing system by eliminating the 90° output beams characteristic in earlier systems. Also, when detection components according to one or more embodiments of the present invention are used, parallel outputs of one or more linear optical components can be tightly "bunched" or clustered to permit more efficient photodetection by a photodetector array, as will be explained in more detail below.

Embodiments of a coherent optical signal processor (e.g., a processing device, diagnostic/testing equipment, etc.)

according to the present invention eliminate much or all earlier system complexity by spatially multiplexing beams to reuse existing components, while also providing reliable path length matching unavailable in Langenhorst-type receivers. The compact nature of some embodiments of the present invention makes these apparatus, systems, etc. ideal not only as optical communication system receivers, but also as diagnostic/testing equipment that can be use in a wide variety of settings and environments, as will be appreciated by those skilled in the art.

Figure 3A:
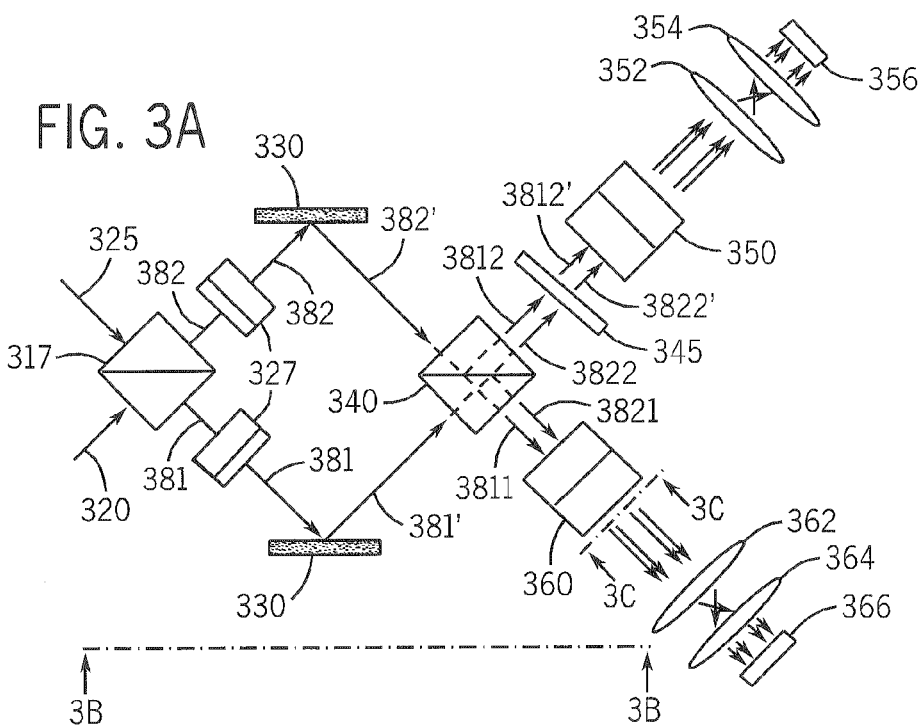
Figure 3B:
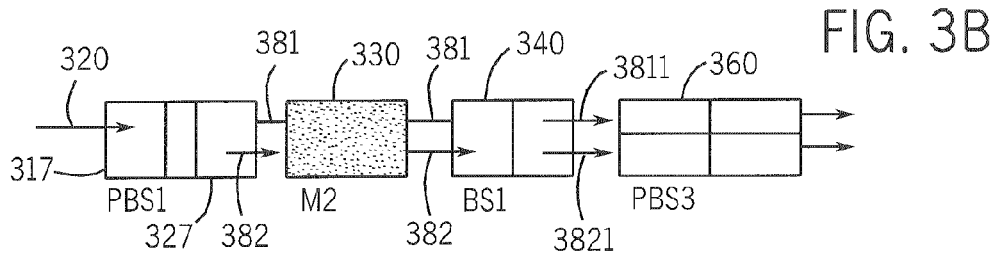
FIG. 3B is a side view of the "lower" branch of system of FIG. 3A.
Figure 3C:
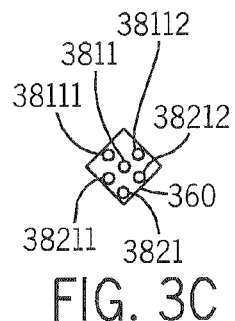
FIG. 3C is an end view of the system of FIG. 3B.
Figure 4A:
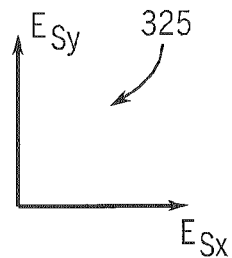
FIG. 4A is a polarization composition diagram of an input signal beam.
Figure 4B:
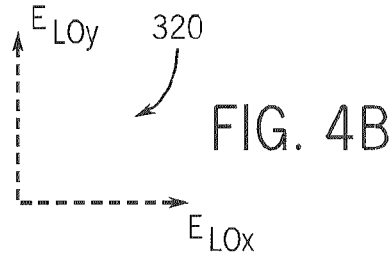
FIG. 4B is a polarization composition diagram of an input local oscillator beam.
Figure 4C:
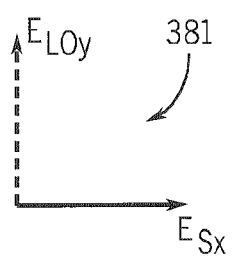
FIGS. 4C and 4D are polarization-multiplexed beam polarization composition diagrams.
Figure 4D:
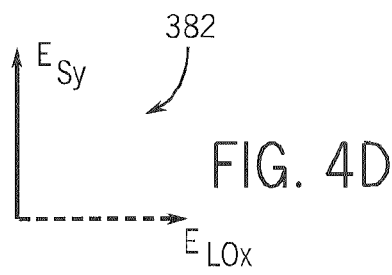

One embodiment of an optical signal processor 310 is shown in FIGS. 3A, 3B and 3C. An unprocessed signal beam 325 and a local oscillator beam 320 are split into two polarizations each using a polarizing beam splitter (PBS) cube 317 and simultaneously polarization-multiplexed. That is, polarization-multiplexing of two beams is defined as splitting each beam into two orthogonal polarization components, then combining and transmitting together as a first signal beam 381 one polarization component of the unprocessed signal beam 325 and an orthogonally-oriented polarization component of the local oscillator signal beam 320. Likewise, the remaining orthogonal polarized local oscillator signal component and input signal component are segregated and transmitted in a second signal beam 382. The relative polarization of incoming signal input beam 325 is represented in FIG. 4A. Similarly, the relative polarization of local oscillator input beam 320 is represented in FIG. 4B. After polarization-multiplexing, the relative polarization-specific content of first output beam 381 of PBS cube 317 is represented in FIG. 4C and the relative polarization-specific content of the second output beam 382 of PBS cube 317 is represented in FIG. 4D.

Figure 4E:
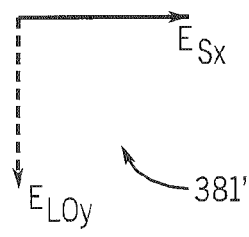
FIGS. 4E and 4F are polarization-multiplexed beam reflected polarization composition diagrams.
Figure 4F:
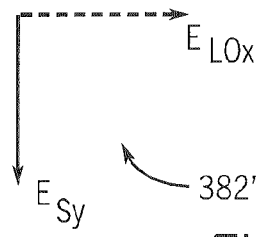

Because each output beam 381, 382 of PBS cube 317 has an input signal polarization component and an orthogonal local oscillator polarization component, the paired input signal and local oscillator signal components of each beam 381, 382 travel a common path, thus removing the need for other optical path length control at the optical wavelength level. Tip plates 327 vertically displace beams 381 and 382 prior to reflection by mirrors 330 (shown more clearly in FIG. 3B). While reflection of beams 381 and 382 by mirrors 330 can affect the polarized components of these beams (the polarization components of the reflected signals 381', 382' are shown in FIGS. 4E and 4F, respectively), it does so uniformly and does not affect the orthogonality of each beam's components and the beams' usefulness for downstream photodetection. As will be appreciated by those skilled in the art, reflection by mirrors 330 has no substantial effect on the performance of the system 310 generally (in fact, other embodiments dispose of these mirrors altogether, thus eliminating any concern for polarization effects from reflection). As will be appreciated by those skilled in the art, some embodiments of the polarization combiner disclosed and claimed herein, and described in more detail below, eliminate any reflection issues because there is no need for reflection of the beams when linear optical components such as the polarization combiner are used.

Figure 4G:
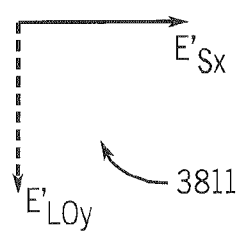
FIGS. 4G and 4H are non-polarizing beam splitter output beam polarization composition diagrams.

Beams 381', 382' are inputs to a non-polarizing beam splitter (NBS) cube 340 and are split so that generally identical (that is, generally equal intensity) copies of each beam 381', 382' are made, shown as output beams 3811, 3812 (generated from beam 381') and 3821, 3822 (generated from beam 382') in FIGS. 3A-3C. Beam pair 3811, 3821 is sent to the "lower" branch shown in FIG. 3A, while beam pair 3812, 3822 is sent to the "upper" branch of FIG. 3A, which includes a waveplate 345. (Beam pair 3811, 3821 is shown with a small horizontal offset between beam 3811 and beam 3821 to help provide clarity to the Figures, but those beams are in fact vertically coplanar. The same is true for beam pair 3812, 3822.) Beams 3811 and 3812 each have a polarization composition shown in FIG. 4G, where $E'_{Sx}$ and $E'_{LOy}$ are given by the following:

$$E'_{Sx} = \frac{1}{\sqrt{2}}(E_{Sx}) \quad E'_{LOy} = \frac{1}{\sqrt{2}}(E_{LOy})$$

Figure 4H:
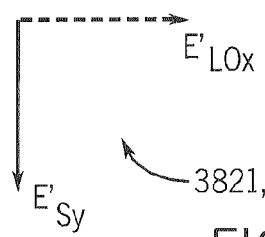

Moreover, beams 3821 and 3822 each a have polarization composition shown in FIG. 4H, where $E'_{Sy}$ and $E'_{LOx}$ are given by the following:

$$E'_{Sy} = \frac{1}{\sqrt{2}}(E_{Sy}) \quad E'_{LOx} = \frac{1}{\sqrt{2}}(E_{LOx})$$

Figure 4I:
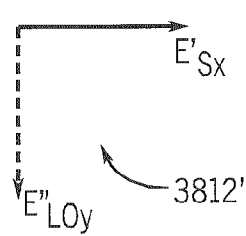
FIGS. 4I and 4J are phase-shifted non-polarizing beam splitter output beam polarization composition diagrams.
Figure 4J:
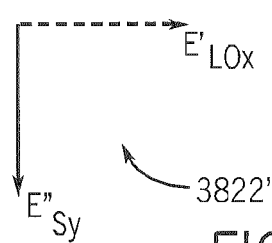

Beam copies made by NBS cube 340 are created and used for phase diversity. Mixing each input polarization field with both the in-phase and quadrature local-oscillator phases enables detection of the in-phase and quadrature portions of the input signal field, that is, the complete complex field. Beam pair 3812, 3822 is transmitted to quarter-wave waveplate 345. The waveplate optical axis is aligned with the signal or the local oscillator polarization, of which there are four pertinent orientations. Only two of these four orientations are substantively different, producing either a +90° or −90° phase shift between the input signal and the local oscillator. As will be appreciated by those skilled in the art, either of these orientations is satisfactory to use in embodiments disclosed herein. Waveplate 345 shifts the phase of the original local oscillator beam by 90° with respect to the signal input beam for the upper branch containing beams 3812, 3822. After the waveplate-induced phase shifting, the phase-shifted beam pair 3812' and 3822' have polarization compositions shown in FIGS. 4I and 4J, respectively, where $E''_{LOy}$ and $E''_{Sy}$ are given by the following:

$$E''_{LOy} = \frac{j}{\sqrt{2}}(E_{LOy}) \quad E''_{SY} = \frac{j}{\sqrt{2}}(E_{Sy})$$

The lower branch of FIG. 3, comprising beams 3811 and 3821, has no waveplate and thus there is no relative phase shifting between the beams.

Some embodiments of the present invention use linear optical components referred to as "Savart devices," as defined herein, to perform differential detection of matched-path-length differential signals. The use of such Savart devices permits a more linear differential detection apparatus assembly that is amenable to integration and packaging. Moreover, dependence on mirrors, tip plates and other equipment and adjustments required with earlier systems can be reduced or eliminated altogether. Additionally, Savart devices used in some of the embodiments of the present invention eliminate multiple beam reflections that have plagued systems using beam splitter cubes. Embodiments of Savart devices for differential detection include, but are not limited to embodiments that utilize a natural 45° orientation that eliminates a half-wave plate that is needed for beam splitter cubes to keep beams in one plane.

A "Savart device" is a symmetrical walkoff plate device (also referred to as a device using birefringent plates or crystals and the like, as will be appreciated by those skilled in the art) defined herein as two cascaded walkoff prisms, the principal properties and structure of which are shown in FIGS. 5A, 5B and 5C. A Savart device's polarization axes (shown in FIGS. 4K and 4L as the polarization axes 361 of Savart device 360 of FIG. 3A; shown in FIGS. 4O and 4P as polarization axes 351 of Savart device 350 of FIG. 3A; and shown in FIG. 5C as the polarization axes 511 and 513 of device 500) split an input beam's polarization into linear orthogonal states. As seen in FIGS. 5A-5C, two walkoff crystals 506, 508 of a given Savart device 500 are arranged so that one polarization state becomes the extraordinary ray (e-ray) in the first crystal and along the ordinary ray (o-ray) in the second crystal, the situation being reversed for the other polarization state. The optical axis 507 of prism 506 and the optical axis of 509 of prism 508 are oriented to achieve a desired output beam configuration, for example the configuration of FIG. 5C (the "optical axis" of a birefringent plate or crystal may also be referred to herein as a "walkoff axis"). If the Savart device 500 is rotated 45° about the axis of propagation of the incident input beam 510, then the output beams 512, 514 of a single input beam 510 are shown in FIG. 5D. The output beam array generated by two, vertically displaced input beams is shown in FIGS. 3C and 5F. In FIG. 5F, input beams 510-1 and 510-2 generate output beams 512-1, 512-2, 514-1 and 514-2 (the array of FIG. 3C is analogous). The output beams 512, 514 of the Figures also may be referred to as "analyzed beams" or "differential detection beams" herein.

Figure 5E:
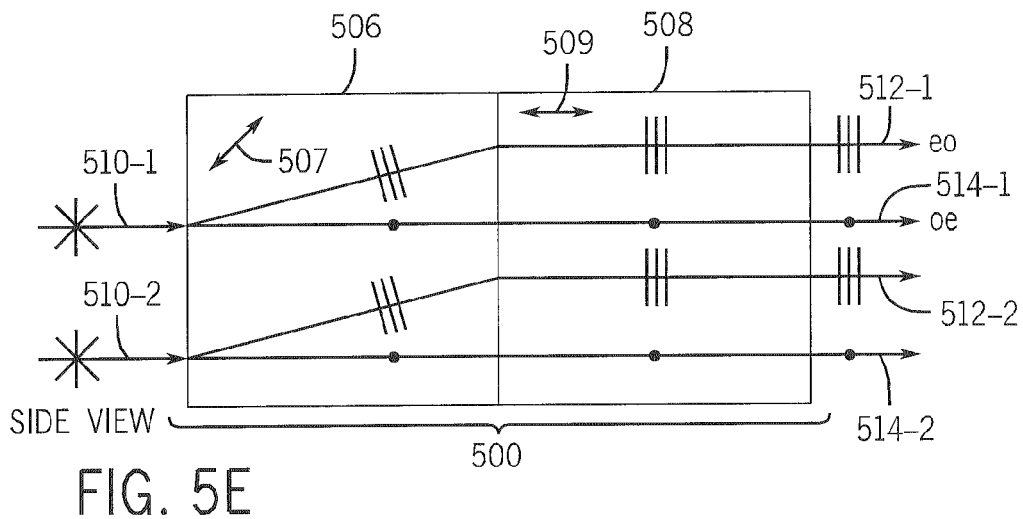
FIG. 5E is a side view of a Savart device having two input beams, where the Savart device is in a horizontal/vertical orientation.

The optical behavior of the Savart device 500 is shown in FIGS. 5A-5C, where a perpendicular incident beam 510 is split into an ordinary ray (o-ray) and an extraordinary ray (e-ray) in the first prism 506. In second prism 508, the ordinary beam becomes the extraordinary beam, exiting the second prism 508 as output beam 514 (also designated the "oe" output beam in FIGS. 5A-5D), while the extraordinary beam in first prism 506 becomes the ordinary beam in prism 508 and exits as output beam 512 (also designated the "eo" output beam in FIGS. 5A-5D). Savart devices 350 and 360 in system 310 of FIG. 3A thus create two differential output beams composed of the interferometer terms for each polarization of an input beam. FIG. 5E illustrates the beam behavior of a Savart device such as that shown in FIGS. 5A-5D where two input beams pass through the Savart device 500. As seen in FIG. 5F (and as also shown in FIG. 3C), the output beam pattern is a square or other rectangular pattern that is useful in connection with the photodetector arrays and telescope imaging systems disclosed herein.

The prisms can be joined to one another or not, as will be appreciated by those skilled in the art. For example, if the crystals 506, 508 are coated with an anti-reflection (AR) coating, as is frequently done during fabrication of individual crystals, then an air gap between the crystals 506, 508 may be desirable. If the crystals are not so coated, then joining the crystals (for example, using an adhesive or other optically suitable bonding material) may be appropriate and desirable using any suitable technique. The same techniques can be applied to the polarization combiner described herein, as appropriate. As will be appreciated by those skilled in the art, a variety of AR coatings are available and an appropriate coating can be selected as a matter of design choice.

As with the crystals of the polarization combiner, the appropriate length of each Savart device crystal can be determined as described below. It is important that the crystals have nearly identical lengths so that the beams' respective paths are matched to much less than a bit-period of the data signal (that is, matching o-rays and e-rays), as will be appreciated by those skilled in the art. The crystal length also is selected to achieve the desired walkoff separation between the output beams of the Savart device. As will be discussed in more detail below, it is desirable in some embodiments to image the output beams of each Savart device onto a photo-detector array using a telescope. The photodetector array can be square, rectangular or in any other shape or configuration that is achievable with and accommodates the output beams of each Savart device, when such devices are used.

The two output beams generated by each input beam in a Savart device emerge from such a Savart device parallel to the input beam's initial propagation direction and, at normal incidence, have zero path difference. Due to the 90° relative positioning of the two walkoff crystals 506, 508 in FIGS. 5A-5D, the displacement of one polarization may be referred to as the "horizontal" direction and the displacement of the other, orthogonal polarization referred to as the "vertical" direction. That is, each walkoff crystal acts on only one polarization. The displacement for one walkoff crystal of thickness $t/2$ is approximately $(0.1) \cdot t/2$ (based on the tangent of the walkoff angle of a calcite crystal cut at a near-optimal angle and using a wavelength of 1550 nm). For a Savart device having two walkoff plates with total length of t, the relative distance between the two output beams is thus $d=(0.1) \cdot (\sqrt{2}) \cdot (t/2) \approx 0.0751$. A calcite Savart device having a total thickness of 1 cm therefore provides a displacement of ~750 μm. As will be appreciated by those skilled in the art, a vanadate-based or other type of crystal also could be used and dimensions relating to those embodiments could be determined readily. Embodiments of Savart devices disclosed and claimed herein can use whatever crystal material is deemed appropriate. Manmade materials such as vanadate have certain advantages over naturally occurring materials such as calcite in many settings, as is well known to those skilled in the art.

It may be advantageous for each Savart device to be rotated by 45° from "square" (as seen in FIGS. 3C and 5D), that is having polarization axes like axes 351, 361 shown in FIGS. 4K, 4L, 4O and 4P relative to the incoming beams' polarization orthogonal states. In such a configuration, the principal polarization states of the Savart device can be viewed as being along "h+v" and "h−v" orientations so that the Savart device mixes two linearly polarized fields with respective orthogonal polarization states h (horizontal) and v (vertical). The displacement of the beams corresponding to the two principal states is for example along "h+v" and "h−v" (that is, the two output beams are vertically multiplexed in which case the input beams should be horizontally multiplexed to avoid overlap) or along "h+v" and "v−h" (that is, the two output beams are horizontally multiplexed).

Figure 4K:
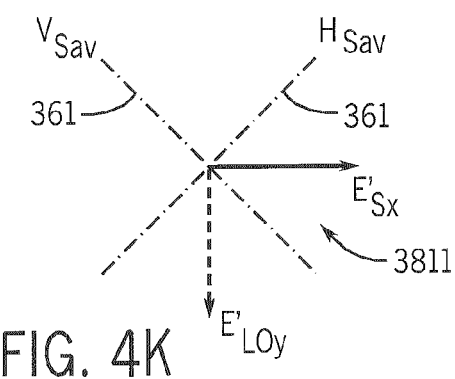
FIGS. 4K, 4L, 4O and 4P are Savart device input beam polarization composition diagrams.
Figure 4L:
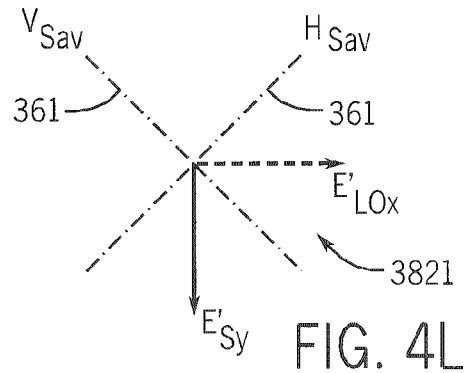
Figure 5F:
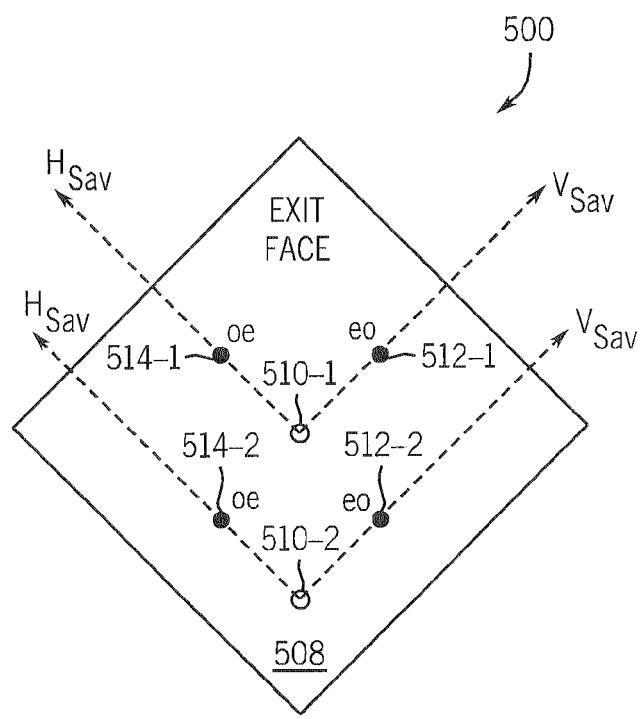
FIG. 5F is an end view of the exit face of the Savart device of FIG. 5E tilted 45° relative to the Savart device position of FIG. 5E.

Unshifted beam pair 3811, 3821 encounters Savart device 360 (shown in FIG. 3C) having axes 361 oriented at 45° to the polarization axes of beams 3811 and 3821, as shown in FIGS. 4K and 4L, respectively. Earlier systems have used non-polarizing beam splitter cubes, which provide output beam propagation directions with a 90° orientation to one another, thus "spreading" the optical receiver system and requiring additional optics and/or adjustments that add complexity and cost to a given system. The use of one or more Savart devices in the embodiments disclosed herein provides parallel output beams that are more easily and economically manipulated, for example during imaging onto photodetector means, as described in more detail below. Moreover, FIG. 3C helps to emphasize graphically the compactness and efficiency of the use of Savart device grouping of beams that makes possible and facilitates accurate imaging of beams for photodetection.

Figure 4M:
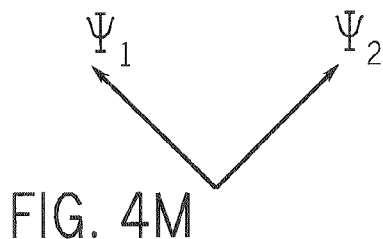
FIGS. 4M, 4N, 4Q and 4R are Savart device output beam polarization composition diagrams.

In FIGS. 3A, 3B, 3C and 6, the output beam array of Savart device 360 is a 4 beam square pattern (again, this pattern can be rectangular or otherwise configured as appropriate). Savart device 360 input beam 3811 will be separated into two rays with electric fields oriented perpendicular or parallel to the crystal axis of the first prism. These fields are expressed as $\Psi_1$ and $\Psi_2$ shown in FIG. 4M. The field of the output beams along the indicated polarization orientation is given by the following:

$$\Psi_1 = -\frac{1}{2}(E_{LOy} + E_{Sx}) \quad \Psi_2 = \frac{1}{2}(E_{Sx} - E_{LOy})$$

Figure 4N:
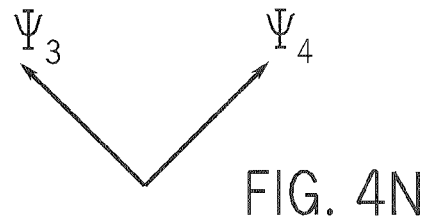

Similarly, input beam 3821 yields $\Psi_3$ and $\Psi_4$ shown in FIG. 4N. The field of these output beams along the indicated direction is given by the following:

$$\Psi_3 = -\frac{1}{2}(E_{LOx} + E_{Sy}) \quad \Psi_4 = \frac{1}{2}(E_{LOx} - E_{Sy})$$

Figure 4O:
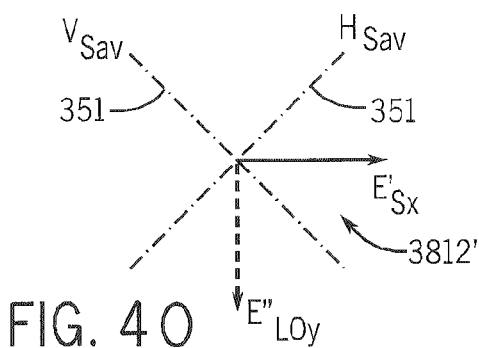
Figure 4P:
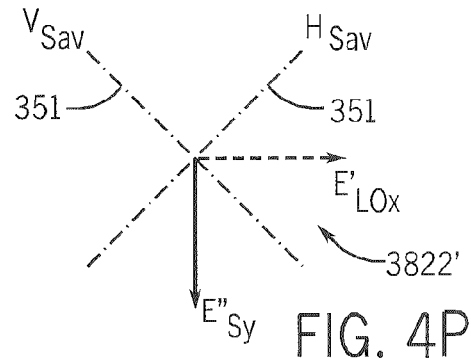

Likewise, phase-shifted beam pair 3812', 3822' also encounters a Savart device 350 having axes 351 oriented at 45° to the polarization axes of beams 3812 and 3822, as shown in FIGS. 4O and 4P, respectively.

Figure 4Q:
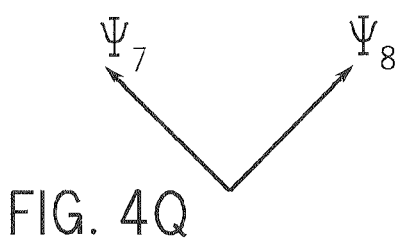

The output beam array of Savart device 350 also is a 4 beam square pattern (similar to that shown in FIG. 3C), except that the input beam pair comprises beams 3812' and 3822' instead. Savart device 350 input beam 3812' yields $\Psi_7$ and $\Psi_8$ shown in FIG. 4Q. The field of these output beams along the indicated direction is given by the following:

$$\Psi_7 = -\frac{1}{2}(E_{Sx} + jE_{LOy}) \quad \Psi_8 = \frac{1}{2}(E_{Sx} - jE_{LOy})$$

Figure 4R:
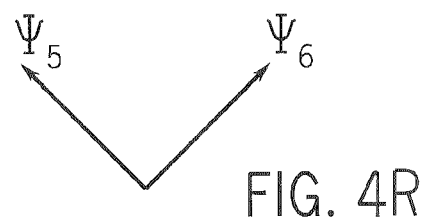

Similarly, input beam 3822' yields $\Psi_5$ and $\Psi_6$ shown in FIG. 4R. The field of these output beams along the indicated direction is given by the following:

$$\Psi_5 = -\frac{1}{2}(E_{LOx} + jE_{Sy}) \quad \Psi_6 = \frac{1}{2}(E_{LOx} - jE_{Sy})$$

Each Savart device images its compact output beam cluster with polarizations shown in FIGS. 4M, 4N, 4Q and 4R on photodetectors for conversion to electrical signals. Photodetectors in some embodiments comprise balanced photodiode pairs (for example, so that $\Psi_1$ and $\Psi_2$ are placed on one photodiode pair, $\Psi_3$ and $\Psi_4$ on another photodiode pair, etc.). Each Savart device output beam pair can then be differentially detected by the balanced photodiode pairs. Using the $\Psi$ values and configurations noted above and in the Figures, the following calculations can be made:

$$|\Psi_1|^2 - |\Psi_2|^2 = \frac{1}{2}(E_{Sx}E_{LOy}^* + E_{Sx}^*E_{LOy}) = \Re e\{E_{Sx}E_{LOy}^*\}$$

$$|\Psi_3|^2 - |\Psi_4|^2 = \frac{1}{2}(E_{LOx}E_{Sy}^* + E_{Sy}E_{LOx}^*) = \Re e\{E_{Sy}E_{LOx}^*\}$$

$$|\Psi_6|^2 - |\Psi_5|^2 = -\frac{1}{2}j(E_{Sy}E_{LOx}^* - E_{Sy}^*E_{LOx}) = \Im m\{E_{Sy}E_{LOx}^*\}$$

$$|\Psi_7|^2 - |\Psi_8|^2 = -\frac{1}{2}j(E_{Sx}E_{LOy}^* - E_{Sx}^*E_{LOy}) = \Im m\{E_{Sx}E_{LOy}^*\}$$

Therefore, assuming sufficient reference local oscillator power along both polarizations, and with suitable calibration for the components, $E_{LOx}$ and $E_{LOy}$, the real and imaginary/complex values of $E_{Sx}$ and $E_{Sy}$ can be determined from the 8 photocurrents detected by any photodetector array(s) in the system. As will be appreciated by those skilled in the art, the local oscillator beam's components might not be known, nor even their ratios, though they are nonetheless usable in connection with embodiments of the present invention.

Figure 6:
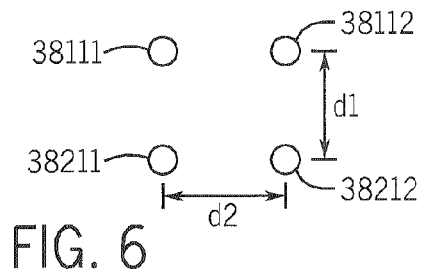
FIG. 6 is a view of a Savart device output beam array.

As seen in FIG. 6, the four output beams in the output beam array of each Savart device 350, 360 have vertical spacing d1 and horizontal spacing d2, which are dictated by the displacement properties of the materials used in a given Savart device (for example, whether calcite is used or vanadate, the crystals' lengths, etc.). Thus, as will be appreciated by those skilled in the art, selection of the material(s), dimensions and optical axis orientation can provide a variety of dimensional variations for the Savart device output beam arrays. As noted above and discussed in more detail below, the compactness and efficiency of the Savart device's beam grouping achievable with the illustrated and other embodiments makes possible and facilitates accurate imaging of beams for photodetection and provides a significant advancement over earlier systems.

In the examples of FIGS. 3A-3C and 8, the output beam array 38111, 38112, 38211, 38212 from Savart device 360 is imaged onto a 4-detector photodetector array 366 using a telescope having lenses 362 and 364. The output beam array shown in FIG. 3C is square, which may or may not have certain advantages with regard to photodetector configuration, imaging the output beam array onto the photodetector configuration, and the like. However, as will be appreciated by those skilled in the art, the output beam array can be configured in a variety of ways using one or more Savart devices, depending on photodetector configuration, photodetector position and/or other considerations. As will be appreciated by those skilled in the art, this type of output beam array pattern generally uses the optical crystal more effectively than a linear array. The area of the rectangular output beam array of FIG. 3C is ~2*d*d (where d is the input beam spacing). A linear arrangement would need an area of ~3*d*d to get the same output beam spacing. In addition, the square/rectangular shape is common for mass-produced passive fiber-optic devices such as circulators. Output beams 38121, 38122, 38221, 38222 from Savart device 350 are similarly imaged onto photodetector array 356 using lenses 352 and 354, as seen in FIG. 3A.

In some of the embodiments disclosed herein, photodetectors (devices that convert optical signals into electrical signals, for example photodiodes or the like) can be mounted to or fabricated on a die or chip in a coplanar, square or rectangular pattern, thus allowing a single Savart device and a simple telescope to image four beams in each Savart device output beam array onto a photodetector array. A square/rectangular patterned Savart device output beam array imaged onto a photodetector chip by a telescope minimizes the lens clear-aperture needed and the detector die-size, and simplifies access to the two outputs of the preferably balanced photodiode pairs with outputs on opposite sides of the chip, as noted in connection with FIGS. 7A and 7B, below. Integrating four photodiodes or other detectors onto one chip provides precisely controllable detector locations that can be coupled to the optics without individual manipulation of each detector's coupling. In the embodiments shown in the Figures, output beam magnifications for Savart devices 350 and 360 are set so that beam waists are smaller than the detector size and so that the beam spacing matches the detector spacing.

Invention embodiments concerning a detector array include, but are not limited to: detector embodiments that are optimized for the optical assembly, in which detectors are incorporated into the optical assembly; detector embodiments in which detector positions on a single die are optimized for the optical design rather than the other way around; detector embodiments in which there are two or more balanced detector pairs on one die; and detector embodiments in which very tight detector packing helps with high-speed balanced detectors by reducing metal (capacitance) between detectors. In various configurations and embodiments, telescopic imaging is used to direct the differential detection beams onto the detectors instead of a lens array thereby enabling relatively widely spaced (for example, 1 mm), wide diameter beams (for example, 0.4 mm). Such wide beam diameters enable a longer optical path (advantageous for polarization diversity) with low divergence, and the spacing is nevertheless tight enough to permit advantageous maximal utilization of the crystals (for example, made of YVO4). Telescopic imaging also reduces positional alignment sensitivity to yield ease of manufacture and robustness against misalignment and tight detector packing which helps with high-speed balanced detectors by reducing metal (capacitance) between detectors. The beams are wider apart than a stock lens-array would permit, but tight relative to their diameters.

Figure 7A:
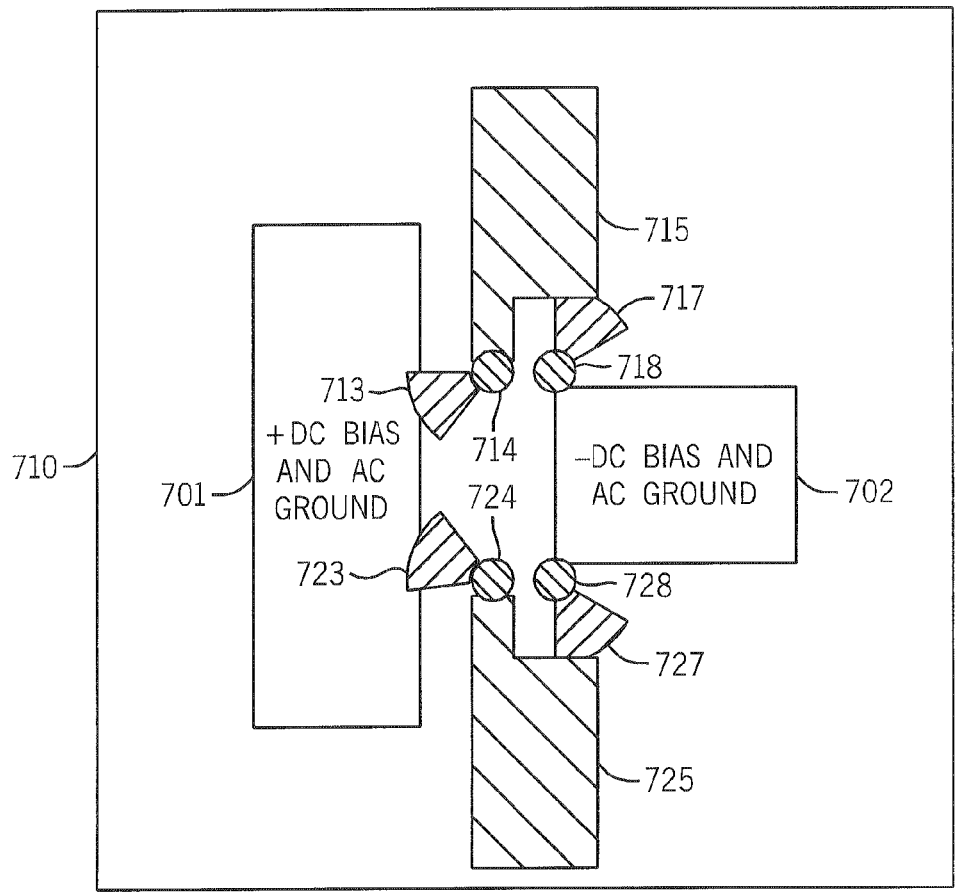
FIG. 7A is a photodetector array chip, with FIG. 7B a schematic of the photodiode arrangement of the photodetector array chip of FIG. 7A.
Figure 7B:
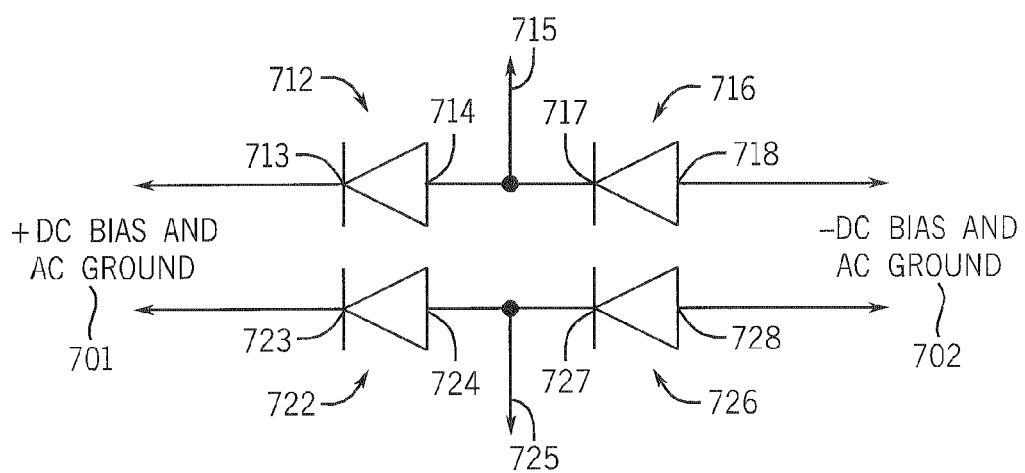

One exemplary configuration of a photodetector chip is shown in FIGS. 7A and 7B, where like reference numerals show a correspondence between the schematic components of FIG. 7B and the areas/components of chip 710 in FIG. 7A. A dual-balanced photodetector chip 710 incorporates four photodiodes 712, 716, 722, 726 configured as two balanced photodiode pairs, as schematically shown in FIG. 7B. FIG. 7B shows a positive DC bias and AC ground 701 and a negative DC bias and AC ground 702. A first photodiode pair 712, 716 has an electrical output transmission line 715. Photodiode 712 includes cathode 713 and anode 714; photodiode 716 includes cathode 717 and anode 718. Similarly, a second photodiode pair 716 has a signal transmission line 725. Also, photodiode 722 includes cathode 723 and anode 724; photodiode 726 includes cathode 727 and anode 728. The physical configuration of chip 710 in FIG. 7A is evident when compared to the schematic illustration of FIG. 7B. For example, the chip can consist of various compositions and dopings of InGaAsP layers grown on InP. The fabrication can be conventional semiconductor processing to remove the InGaAsP layers outside the photosensitive regions and add conducting layers for electrical contact. Other configurations for the chip and other layouts, etc. will be apparent to those skilled in the art.

The compact nature of the output beam array or cluster of each Savart device 350, 360 is well-suited for imaging onto the photodetector array of chip 710. The Savart device output beams can be telescopically imaged onto the detectors of chip 710, though other techniques are available for getting the Savart device output beams to their respective photodetectors in other embodiments, as will be appreciated by those skilled in the art. Earlier systems used an individual lens for each beam being imaged, thereby limiting the spacing of beams and lens both. The compact beam array of a Savart device according to one or more embodiments of the present invention avoids this crowding problem while at the same time reducing the cost and complexity of the detection apparatus.

Figure 8:
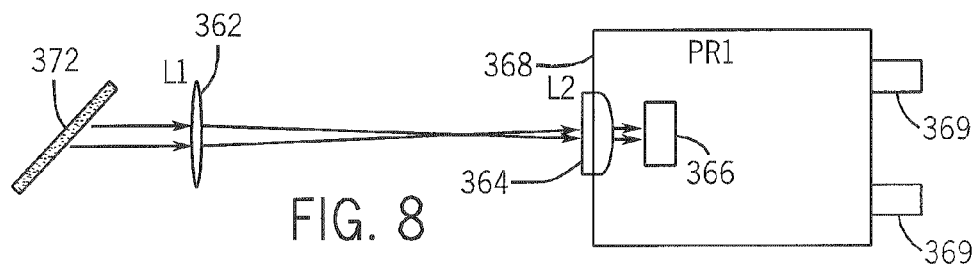
FIG. 8 is a view of an integrated telescope lens and photodetector array used in connection with another telescope lens and a mirror.

In FIG. 8 two groups of two beams (for example, beams 38111, 38112, 38211, 38212 from Savart polariscope 360, as shown in FIG. 3C) are incident on lens 362 (for example, a Thorlabs LA1134-C lens having a focal length of 60 mm) and subsequently lens 364 (for example, a Lightpath 350340 lens having a focal length of 4.03 mm). These lenses together yield a magnification of the beams onto a detector array 366 (using the Lightpath and Thorlabs lenses noted above, the magnification can be adjusted to 0.06). As will be appreciated by those skilled in the art, the chip-mounted detector spacing dimensions and telescope magnification can play a key role in system design, for example by dictating the dimensions of the crystalline polarization elements (for example, a polarization combiner as described below and Savart devices described above) that are used to split and combine the signal and local oscillator beams' components.

In FIG. 8 a photoreceiver 368 has electrical outputs 369 and a photodetector array or component 366 that can comprise a 4-detector array similar to chip 710. Prior to magnification by lenses 362, 364, the beams 38111, 38112, 38211, 38212 can be spaced apart 1 mm and have diameters (that is, waists) of 0.5 mm. Using the other dimensions, etc. in this exemplary system, the post-magnification beams are spaced apart 60-µm and have diameters of 30-µm. In some embodiments of the present invention, spacing between photodiodes in a given photodiode pair does not exceed 250-m. Moreover, the photodiode pairs themselves are not more than 250-m apart from one another. In other embodiments, photodiodes in a given pair are less than 80-µm or even less than 60-µm apart. Likewise, the photodiode pairs can be spaced apart from one another by significantly less than 250-µm, for example 80-µm, 60-µm or less.

In some embodiments of chip 710 of FIG. 7A, each photodetector/photodiode has a 40 µm diameter, with 60 µm spacing between photodiodes. Chip 710 is designed for a 10-Gbaud symbol rate and back illumination. Where exemplary 60 µm spacing is used between photodetectors, lenses can be selected to achieve the desired magnification. Using the desired magnification and the 60 µm detector spacing, the Savart device output beam spacing required is 1 mm. As will be appreciated by those skilled in the art, other lens types, focal lengths, detector spacings, etc. can be used to achieve desired performance of a coherent optical signal processing system according to one or more embodiments of the present invention.

By making lens 364 part of the photoreceiver assembly 368, the distance from the detector array 366 to the lens 364 can be controlled during assembly to avoid alignment issues during use. Only adjustment in the plane of the detector array 366 is required. This can be achieved by adding another mirror 372, before lens 362 (with the added advantage of obtaining parallel coaxial outputs), or by translating the entire receiver/telescope assembly (that is, components 362, 364, 366, 368 could be translated as a group). Other systems use the mirror, plus having an x-y adjustment on the detector, and a z adjustment on the 4-mm lens. The x-y-z adjustments can be used to get the beams close to the target and in focus, then the mirror for fine adjust.

More generally, and using the beam separations d1, d2 of FIG. 6, the beam groups impacting the photodetector array are vertically separated by d1*M at the photodetector plane, while beams in the group are horizontally separated by d2*M, both of which are dictated by Savart device design and magnification M, defined by the ratio of focal lengths for lenses 362 and 364, as will be appreciated by those skilled in the art.

The detectors in FIG. 8 can be arranged in any component and/or device 366 that is convenient for the optical assembly and electrical design, for example in photoreceiver device 368. One advantage of imaging a beam array onto the detectors of array 366, as compared to earlier systems and devices, is that detector spacing can be quite closer than available in earlier devices and/or systems, thus reducing stray capacitance when the detectors are coupled together to provide a balanced output (for example, as seen in FIG. 7B). This can be done while maintaining practical beam separation in the optics (for example, in the exemplary configuration discussed above, the pre-telescope, inter-beam spacing can be 1 mm, with each beam having a diameter of 0.5 mm, with the post-telescope (imaged) beams spaced apart 60-μm and having diameters of 30-μm).

If instead the beams were separately focused onto separate detectors, as has been done in prior systems, detector spacing and electrical interconnect lengths would need to equal the spacing between beams prior to the telescope, which typically leads to capacitance and other potential problems and/or complicating factors. The minimum spacing in such systems typically is limited by the width of the individual lenses used to focus individual beams, as well as the optical path length (as will be appreciated by those skilled in the art, the farther a beam has to go without substantial divergence, the bigger the beam has to be in diameter). Therefore, embodiments of the present invention permit larger input beam spacing and larger input beam diameters, which give those beams longer working distances and allow them to stay nearly collimated throughout the entire system.

In addition to reducing cost and optical loss, moving the detectors into the optical assembly and using telescopic imaging for photodiode coupling relaxes all alignment tolerances by the telescope magnification. Also, unlike the optical fiber, a photodiode is effective at receiving light from almost any angle in 2π steradians. Earlier coherent-receiver optical assemblies required alignment at the output plane to a fraction of the fiber core diameter and a fraction of the acceptance angle (about 0.5-μm and 50-mrad, respectively). By comparison, exemplary embodiments of the present invention only require alignment to about 50-μm, substantially relaxing tolerances. However, assuming 4-cm telescope length and 2-μm detector alignment tolerance, the beams being input onto the photodetector array must be parallel to ~1-mrad to minimize optical loss at the detector.

Figure 9A:
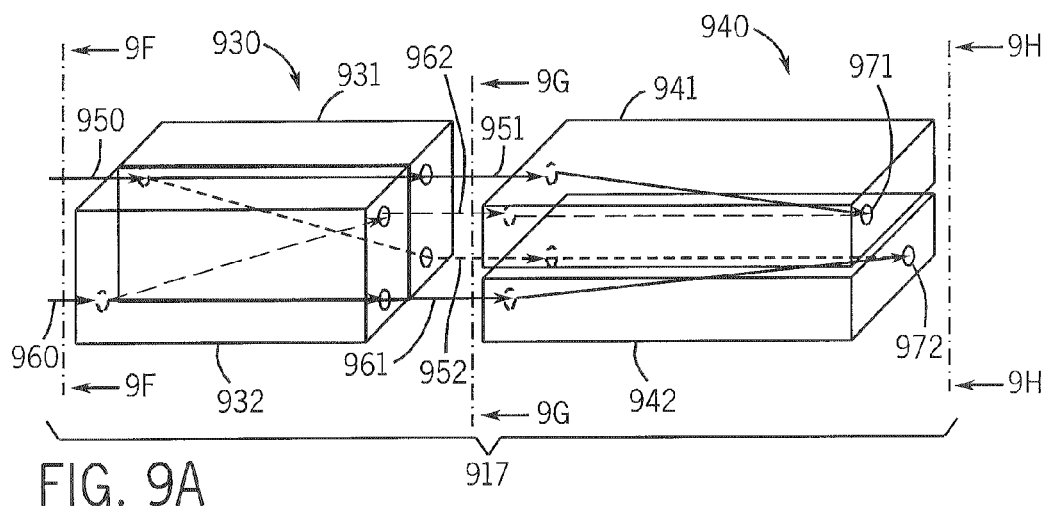
FIG. 9A is a perspective view of a polarization combiner.

Some embodiments of the present invention include a polarization combiner such as the combiner 917 shown in FIG. 9A, which can replace the PBS cube 317 of FIGS. 3A and 3B. Polarization combiner 917 is a "linear optical component" (as defined herein) that provides a highly linear configuration that generates output beams that: are polarization diverse; are precisely spaced apart; have matching path lengths; are parallel; and can be used efficiently for differential detection. When compared with earlier combiners (for example, PBS cubes), this polarization combiner eliminates the need for such beam splitter cubes (which "spread" the coherent optical signal processing system due to the 90° output beam propagation direction/orientation), as well as the tip plates, mirrors (that require six adjustments for positioning, in addition to requiring future adjustments) and adjustments that are required with such equipment. In a broader sense, use of these polarization combiner embodiments also contributes to the creation of a differential detection system that is wholly based on crystal fabrication, thus reducing or eliminating the need for adjustable mounts. Along with eliminating these complexities, the elimination of a number of components currently required in such systems also simplifies manufacture/fabrication of the differential detection systems and reduces costs substantially.

Thus, embodiments of a polarization combiner include, but are not limited to embodiments that eliminate at least one beam splitter cube, two tip plates and two mirrors together with their adjustable mounts used in earlier systems; eliminate multiple adjustments and thus dramatically simplify manufacturing and reduce costs; match path lengths; and produce a more linear optical detection system layout that makes the entire assembly integrable into an assembly that relies on crystal fabrication accuracy rather than multiple adjustments and adjustable mounts (including, in some embodiments, use of one or more of the Savart device embodiments herein).

In earlier differential detection systems and the like, a polarizing beam splitting element typically has been a cube used to split and combine two input beams that must be perpendicular to one another upon entering the cube. Some embodiments of a polarization combiner disclosed and claimed herein use four identical prisms made of a suitable birefringent material (for example, calcite or vanadate) to generate a pair of polarization diverse output beams. The beams provided as inputs to the polarization combiner for splitting and combining can be supplied using a variety of techniques and/or apparatus, as is well known to those skilled in the art. In some embodiments of the present invention, the polarization combiner is coupled to an input beam collimation unit that supplies parallel input beams (for example, the signal beam 325 and local oscillator beam 320 of FIG. 3A).

Figure 9D:
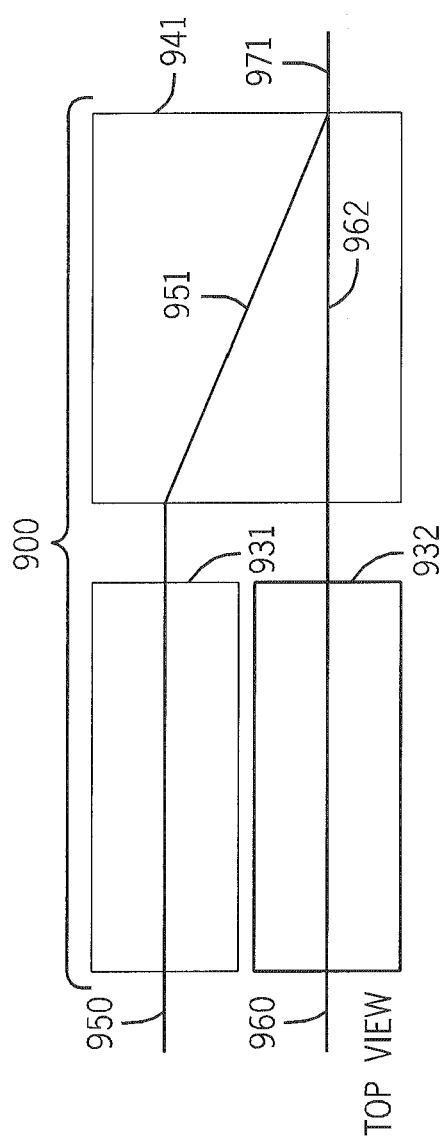
FIG. 9D is a top view of the polarization combiner of FIG. 9A, taken along a cross-sectional horizontal plane through birefringent crystal 941.
Figure 9E:
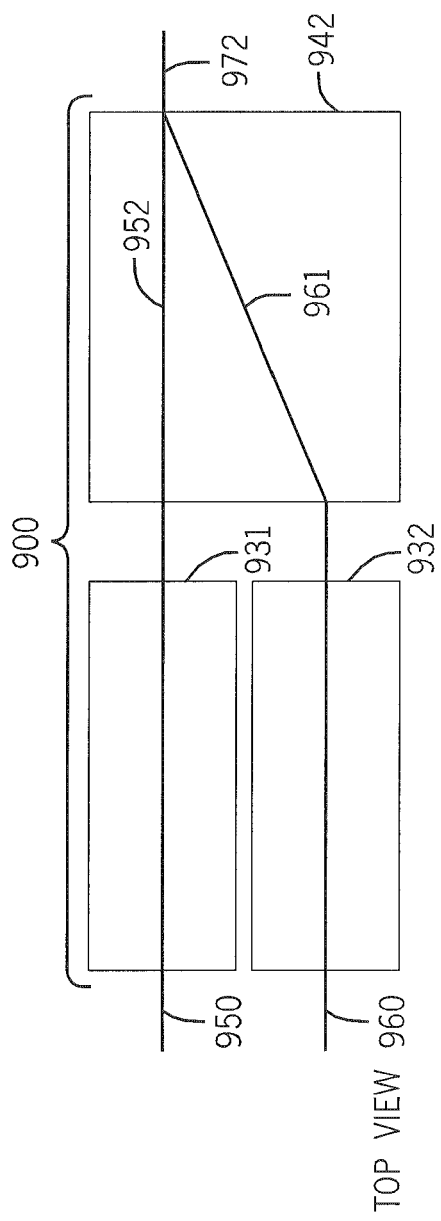
FIG. 9E is a top view of the polarization combiner of FIG. 9A, taken along a cross-sectional horizontal plane through birefringent crystal 942.
Figure 9F:
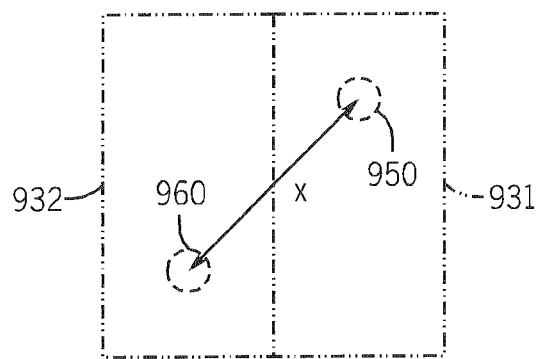
FIG. 9F is a cross-sectional view of the entrance faces of birefringent crystals 931, 932 of FIG. 9A looking toward the origin of beams 950, 960.
Figure 9G:
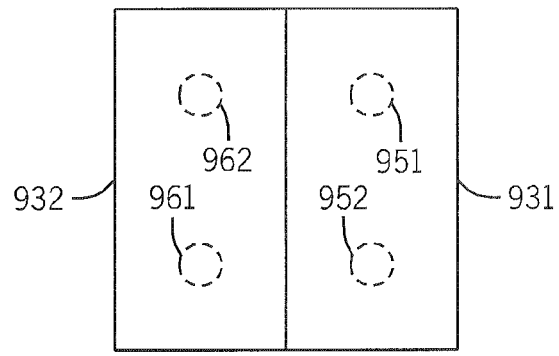
FIG. 9G is a cross-sectional view of the exit faces of birefringent crystals 931, 932 of FIG. 9A.
Figure 9H:
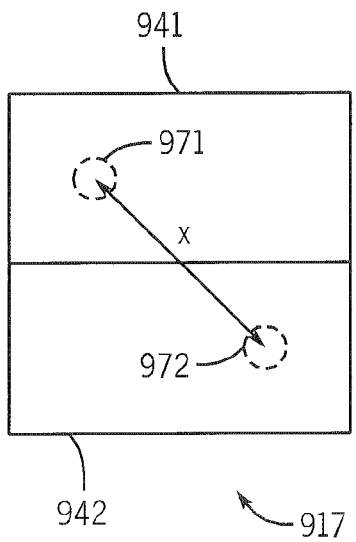
FIG. 9H is an end view of the exit faces of birefringent crystals 941, 942 of FIG. 9A.
Figure 9I:
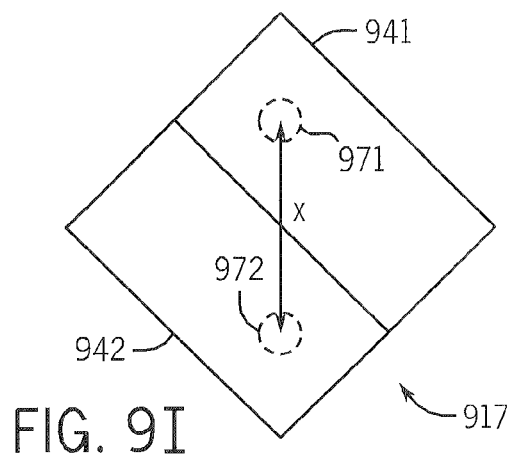
FIG. 9I is an end view of the polarization combiner of FIG. 9H tilted 45°.

One embodiment of a polarization combiner 917 of FIG. 9A is comprised of a pair of birefringent material prism pairs 930, 940 set so that each prism's optical axis is oriented so that the polarization combiner performs a "split-combine" sequence. The input beams' behavior, as well as the component beams' behavior is shown in FIGS. 9B, 9C, 9D and 9E. FIG. 9B is a side view showing the behavior of beams in the generally vertical plane of prism 932. FIG. 9C is a side view showing the behavior of beams in the generally vertical plane of prism 931. FIG. 9D is a top view showing the behavior of beams in the generally horizontal plane of prism 941. FIG. 9E is a top view showing the behavior of beams in the generally horizontal plane of prism 942. FIG. 9F is an end view from the surface of prism pair 930, including prisms 931, 932, looking toward the origin of the input beams 950, 960 (in the direction of the arrows of line 9F-9F of FIG. 9A). FIG. 9G is a cross-section view taken along and looking in the direction of the arrows of the line 9G-9G of FIG. 9A. FIG. 9H is an end view toward the surface of prism pair 940, including prisms 941, 942, looking toward the origin of the input beams 950, 960 (in the direction of the arrows of line 9H-9H of FIG. 9A). FIG. 9I shows the same view of FIG. 9H, but tilted 45° to generate vertically displaced, parallel output beams 971, 972, which are separated from one another by a spacing x.

As seen in FIGS. 9A-9I, first prism pair 930 has a first prism 931 and a second prism 932, side by side, with each prism's optical axis oriented to generate the walkoff beam orientation of FIGS. 9A-9I. When a single input beam 950 (for example, input signal beam 325 of FIG. 3A) enters prism 931 at or near normal incidence, the o-ray pass through such a prism nearly undeviated and exits prism 931 as output beam 951, whereas the e-ray is displaced vertically downward and exits the prism parallel to the o-ray as output beam 952. Each output beam 951, 952 contains an orthogonal polarization component of the original input beam 950 (for example, vertical and horizontal components). Similarly when a second, single input beam 960 (for example, local oscillator input beam 320 of FIG. 3A) enters prism 932 at or near normal incidence, the o-ray pass through such a prism nearly undeviated and exits as output beam 961, whereas the e-ray is displaced vertically upward and exits the prism parallel to the o-ray as output beam 962. Again, each output beam 961, 962 contains an orthogonal polarization component of the original input beam 960 (for example, vertical and horizontal components).

A second prism pair 940 is downstream of pair 930 and comprises prisms 941 and 942. Rather than the side-by-side orientation of pair 930, prisms 941 and 942 are stacked vertically (that is, one on top of the other). Moreover, rather than being oriented to split a single input beam into two polarized component beams, each prism in pair 940 is oriented to combine two input beams (having orthogonal polarizations) into a single, polarization-multiplexed output beam, as seen in FIG. 9A. Therefore, output beam 951 and output beam 962 are now inputs to prism 941, which combines the two beams into a single, polarization-multiplexed output beam 971. Similarly, output beam 952 and output beam 961 are now inputs to prism 942, which combines the two input beams into a single, polarization-multiplexed output beam 972. If input beams 950 and 960 look like the beams shown in FIGS. 4A and 4B, respectively, the output beams 971 and 972 will look like FIGS. 4C and 4D in terms of being polarization-multiplexed.

The input beams 950 and 960 can be seen clearly in FIG. 9F, which is a view of the input surface of polarization combiner 917 at prisms 931 and 932 (looking from a positive Z direction towards the origin). The split beams 951, 952, 961, 962 are shown clearly in FIG. 9G, which is a cross-section of the polarization combiner 917 in an air gap between the first and second birefringent prism pairs 930 and 940 (again, looking from a positive Z direction towards the origin). Finally, output beams 971 and 972 are shown at the output of polarization combiner 917 are shown clearly in FIGS. 9H and 9I.

Where an air gap is noted in connection with embodiments of the present invention, this again is due to the fact that many crystals available in bulk already have AR coatings designed to interface to air. If no such AR coating is present on the crystals used in some embodiments, it may be more advantageous in those situations to avoid the air gap configuration and instead to join the crystals together in any suitable manner.

Prisms such as those shown in the polarization combiner 917 of FIG. 9A are inexpensive because single plane-parallel prisms are easy to make, and because no great precision is required in the orientation of the prisms' optical axes, so long as all four prisms 931, 932, 941, 942 are identical and used symmetrically in the embodiment(s) of FIGS. 9A-9I. Although path differences of the o-ray and e-ray in each prism are different, the combination of the o-rays and e-rays in the first and second prism pairs 930, 940 provide a symmetry that matches path lengths easily and inexpensively in embodiments of the polarization combiner 917. As will be appreciated by those skilled in the art, as can be seen from the "diagonal" orientation of the output beams 971 and 972 in FIG. 9H, the entire assembly 917 can be rotated by 45° if the output beams are to be vertically or horizontally multiplexed, for example as shown in FIG. 9I. In addition, a half-wave prism oriented at 22.5° would then be required to rotate the output beams' polarizations 45° so that they match the orientation of the outputs of PBS cube 317 in FIG. 3A.

The crystals used in embodiments of the polarization combiner according to the present invention are preferably all made of the same material, as will be appreciated by those skilled in the art, and can be made of any suitable material (for example, calcite is one natural material and vanadate is a synthetically generated material—YVO4 (Yttrium orthovanadate) is a positive uniaxial crystal grown with Czochralski method, has a wide transparency range and large birefringence, which make it desirable for many applications and an excellent synthetic substitute for calcite and rutile crystal). Moreover, all four prisms 931, 932, 941, 942 preferably have the same dimensions. The required length, L, of each crystal prism can be determined by using (1) the desired spacing, x, of the parallel beams generated after splitting and combining the original input beams, and (2) the walkoff angle, $\alpha$, between the o-ray and e-ray in the crystal which, in a uniaxial crystal, can be calculated from the refractive indices, $n_o$ and $n_e$, and the angle of the optical axis, $\theta$, relative to the beam:

$$\alpha = \tan^{-1}\left(\frac{n_o^2}{n_e^2}\tan\theta\right) - \theta$$

Because the walkoff angle varies with changes to the optical axis of a crystal, the walkoff angle $\alpha$ can be chosen to be the angle that provides a sufficiently large walkoff displacement at a given wavelength, for example 1550 nm. The preferred crystal prism length, L, then is calculated using:

$$L = \frac{x}{\sqrt{2}\tan\alpha}$$

again, where x is the desired parallel spacing/separation between polarization diverse beams at the polarization combiner's output (beams 971 and 972 in FIGS. 9A-9I). An appropriate clear aperture can be assumed for use in connection with various embodiments. Moreover, to maintain appropriate symmetry for splitting and combining each input beam's o-ray and e-ray, as seen in FIGS. 9A-9I, the two beams provided as inputs to the polarization combiner are located at opposite corners of a square (for example, see FIGS. 9F and 9G) whose dimensions are calculated based on the input beams' separation (for example, for a desired output beam separation x of 1 mm, the required walkoff displacement is approximately 0.707 mm). Using exemplary values of $\alpha$=5.756° and x=1 mm, each of the 4 crystals 931, 932, 941, 942 would be approximately 7.015 mm long. These exemplary specifications for the apparatus underscore another advantage of the use of crystals in embodiments of the present invention. Standard dimension crystals (for example, 7 mm stock crystals) that are relatively inexpensive can be used and the spacing of the collimator adjusted to accommodate such standard component dimensions and/or specifications. Such easily variable spacing within the system makes embodiments of the present invention especially useful and versatile for various applications.

As seen in FIGS. 9F, 9G and 9H, the output beams of the polarization combiner will be two polarization diverse (split and overlapped) beams at the other two corners of the square. It is convenient for further beam processing to have the output beams either horizontally or vertically displaced. Therefore, as can be seen from FIG. 9A, if two horizontally displaced, linearly polarized input beams having polarization states of 0° are provided at the input of 4-crystal polarization combiner 917 that is rotated 45° from that shown in FIG. 9A, for example as shown in FIG. 9I, then the two polarization diverse output beams 971 and 972 are vertically displaced as they exit the polarization combiner 917. Those skilled in the art will recognize that any desired output separation can be achieved based on the crystal material, walkoff angle, crystal length, etc., as discussed above. In light of other advantageous aspects of some embodiments of the present invention, the relatively "tight" parallel output beam separation on the order of 1 mm (as referred to above) can be used in connection with other embodiments of the present invention, as described in more detail herein.

Figure 9J:
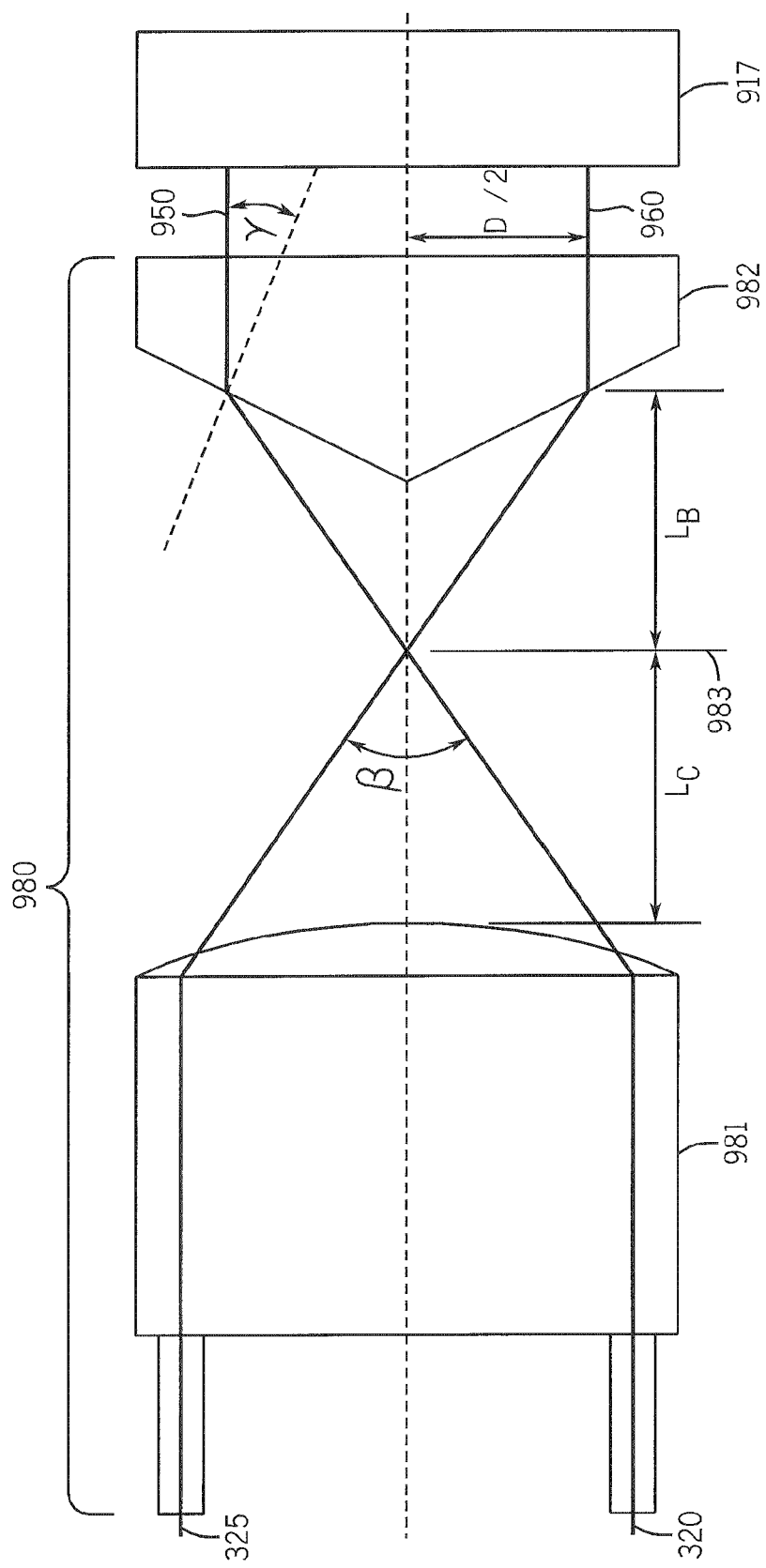
FIG. 9J is a beam diagram of a collimator unit and biprism used to generate input beams for the polarization combiner of FIG. 9A.

In some embodiments of the present invention, the inputs of polarization combiner 917 of FIG. 9A are coupled to an input beam collimation unit 980 shown in FIG. 9J. Unit 980 comprises a beam collimator 981 (for example, a two fiber collimator made by Photop Technologies, Inc.) and optically coupled to a biprism 982 to transmit the two original beams (for example, input signal beam 325 and local oscillator input beam 320 of FIG. 3A) to the first birefringent prism pair 930 of polarization combiner 917 of FIG. 9A. When a collimator 981 is used to generate the polarization combiner's input beams, any appropriate multiple-fiber collimator can be used. As shown in FIG. 9J, collimator 981 produces output beams having a specified crossing length, $L_c$, and crossing angle, $\beta$, which describe the intersection of the exiting collimator beams which, though collimated internally and individually, are not parallel to one another (thus the crossing angle $\beta$).

Using a desired parallel beam separation D for the inputs to polarization combiner 917, biprism 982 can be interposed between the collimator output and the polarization combiner input to bring the output beams of collimator 981 into parallel orientation before entering the first birefringent prism pair. Biprism 982 has a biplanar input that redirects the collimator's nonparallel output beams into parallel beams upon exiting biprism 982. Beams exiting collimator 981 with crossing angle $\beta$ have a crossing length $L_C$. Biprism 982 is a distance $L_B$ from the crossing point 983 of the beams, as seen in FIG. 9E. Angle $\gamma$ is selected for the input surfaces of biprism 982 such that:

$$\sin\left(\gamma + \frac{\beta}{2}\right) = n\sin(\gamma)$$

where n is the refractive index of the biprism material. For small angles, this reduces to:

$$\gamma = \frac{\beta}{2(n-1)}$$

To match the required input spacing D for polarization combiner 917, the distance from the crossing point 983 to biprism 982 will be:

$$L_R = \frac{D}{2\tan\left(\frac{\beta}{2}\right)}$$

Thus the spacing between collimator 981 and biprism 982 can be calculated and fixed during construction of the system. Careful definition of the beam spacing D of this collimator/ biprism assembly directly impacts the ability of the telescope assembly described above to image the output beam array of each Savart device onto a highly efficient photodetector array/ chip, such as those discussed above and depicted as examples in the Figures.

Figure 13A:
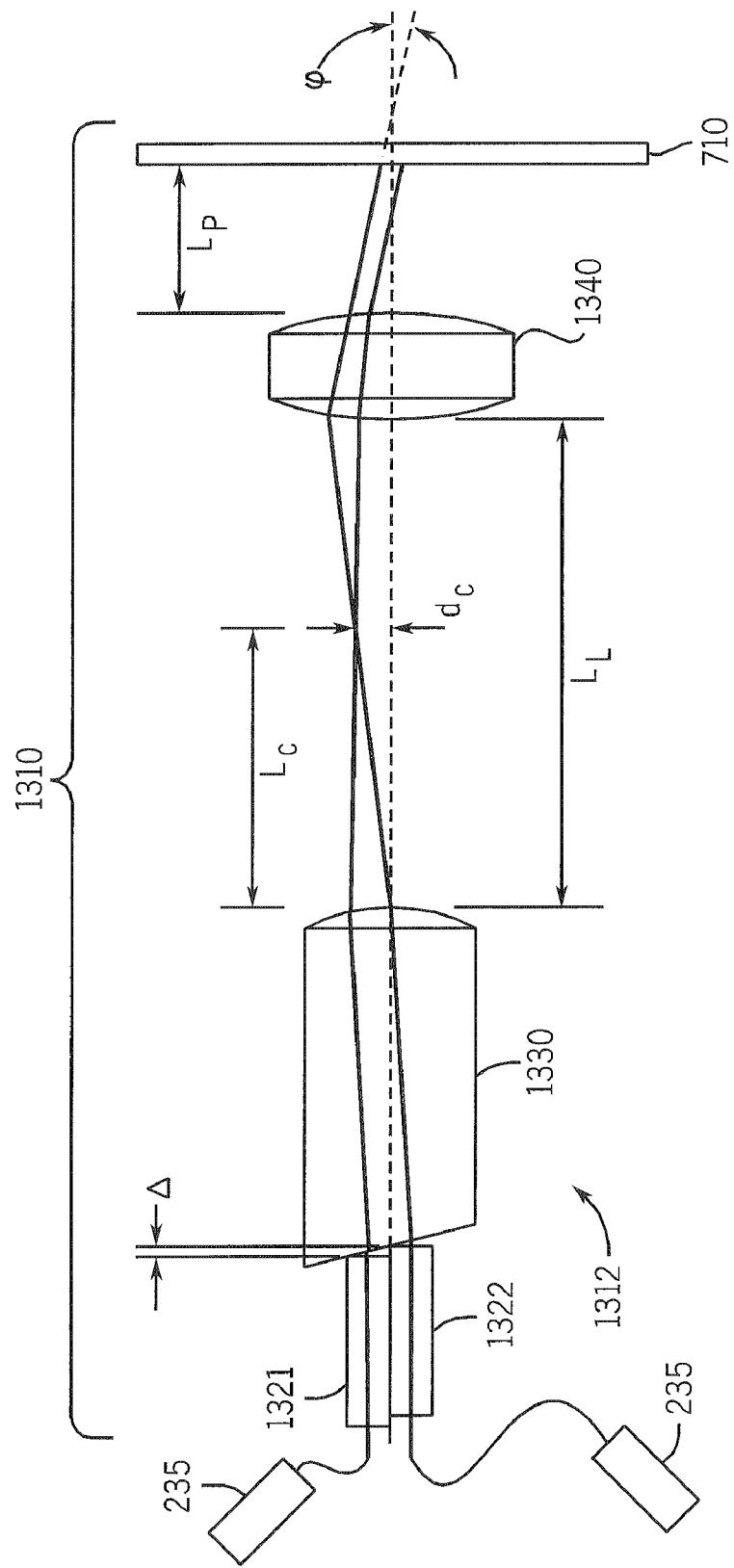
FIG. 13A is a detection unit comprising a collimator, a coupling lens and a photodetector array.

The input beam collimation unit 980 of FIG. 9J can be modified to be used as a fiber coupler for use in other coherent optical signal processing systems, especially in a detector configuration 1310 having an integrated photodiode array such as the chip 710 described in connection with the embodiment of FIGS. 7A and 7B. In a two fiber collimator 1312 shown in FIG. 13A, input beams are provided by two fiber couplers 235 (like those shown in FIG. 2) to the collimator's C-lens 1330 using fiber 1321 and fiber 1322. The off-axis location of the fiber cores results in the output beams emerging from the C-lens at an angle and crossing at a distance $L_c$ from the C-lens. A coupling lens 1340 is provided a distance $L_L$ from the collimator's lens 1330. Coupling lens 1340 is a distance $L_p$ from the plane of the photodetector array 710 and is coaxial with the collimator lens 1330. Coupling lens 1340 redirects the beams to the photodetector array 710 at a slight angle $\phi$. At the detector plane, a diffraction-limited spot diameter of 10-µm is readily achievable. In some embodiments, lens 1330 and lens 1340 have the same diameter. Although the exiting beams may make an angle $\phi$ relative to the Z axis depending on the choice of C-lens 1330, distance $L_P$ can be set so that each beam crosses the photodetector plane where each individual beam reaches its waist position. Fiber coupling the detector in this manner enables the detector array to be used with optical hybrid systems that have fiber-coupled outputs, for example systems such as system 210 of FIG. 2 in which beams to be detected are not parallel to one another and may be located throughout the system 210.

Figure 13B:
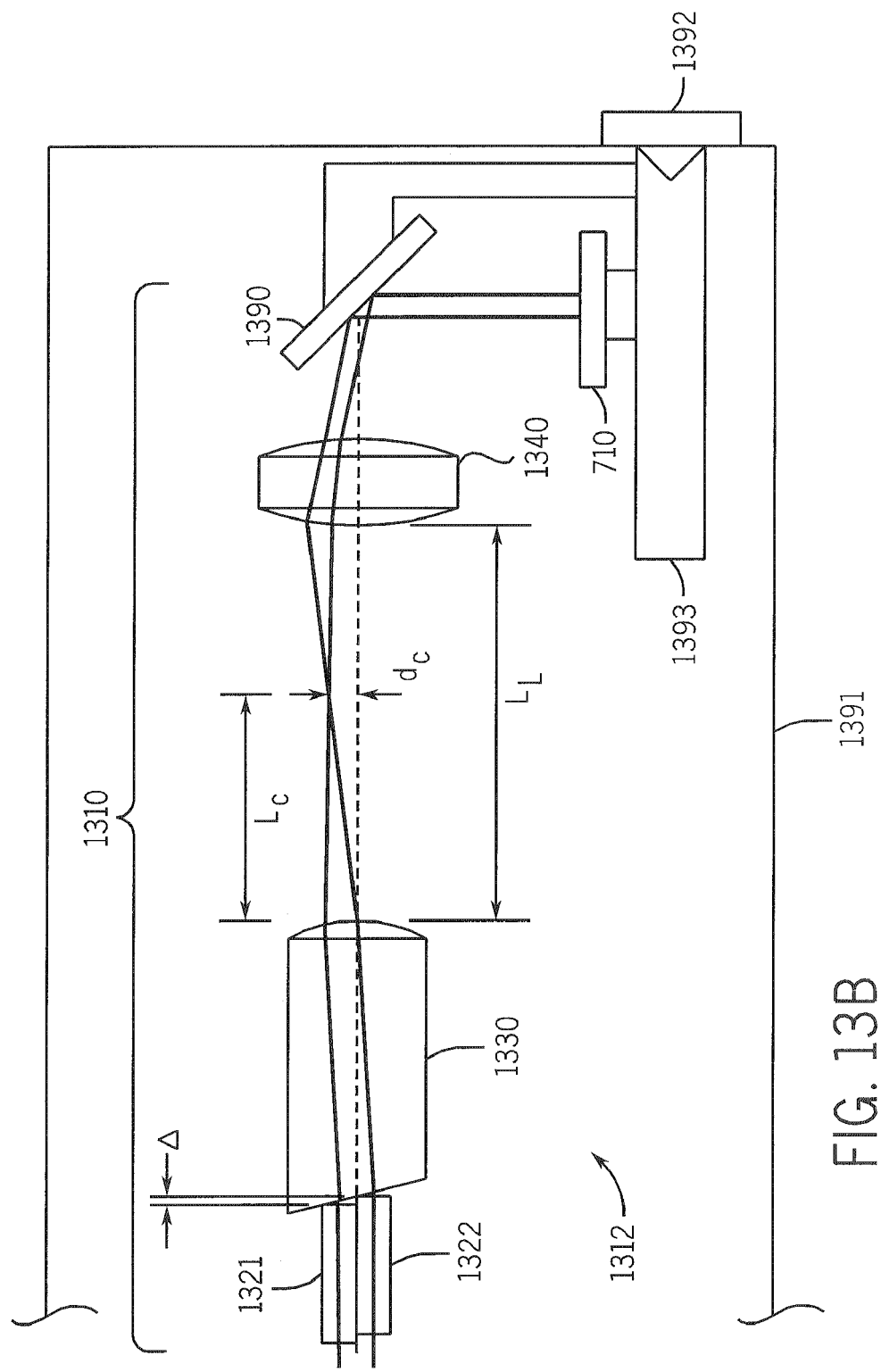
FIG. 13B is a detection unit comprising a collimator, a coupling lens and a photodetector array configured with a turning mirror.

In an alternate embodiment shown in FIG. 13B, a similar collimator/coupling lens combination is used. However, a turning mirror 1390 is positioned to image the beams onto a photodetector array 710. This configuration takes into account a common photodetector arrangement, namely the use of a microwave package/amplifier unit 1391 or the like wherein the unit is connected to an RF connection 1392. A circuit board 1393 has the turning mirror 1390 mounted to it, as well as the photodetector array 710. The beams from the coupling lens 1340 are reflected by mirror 1390 to the photodetector chip 710 so that substantial changes to the microwave package/amplifier unit 1391 are unnecessary. Other variations and alternate embodiments relating to this configuration will be apparent to those skilled in the art.

Figure 10:
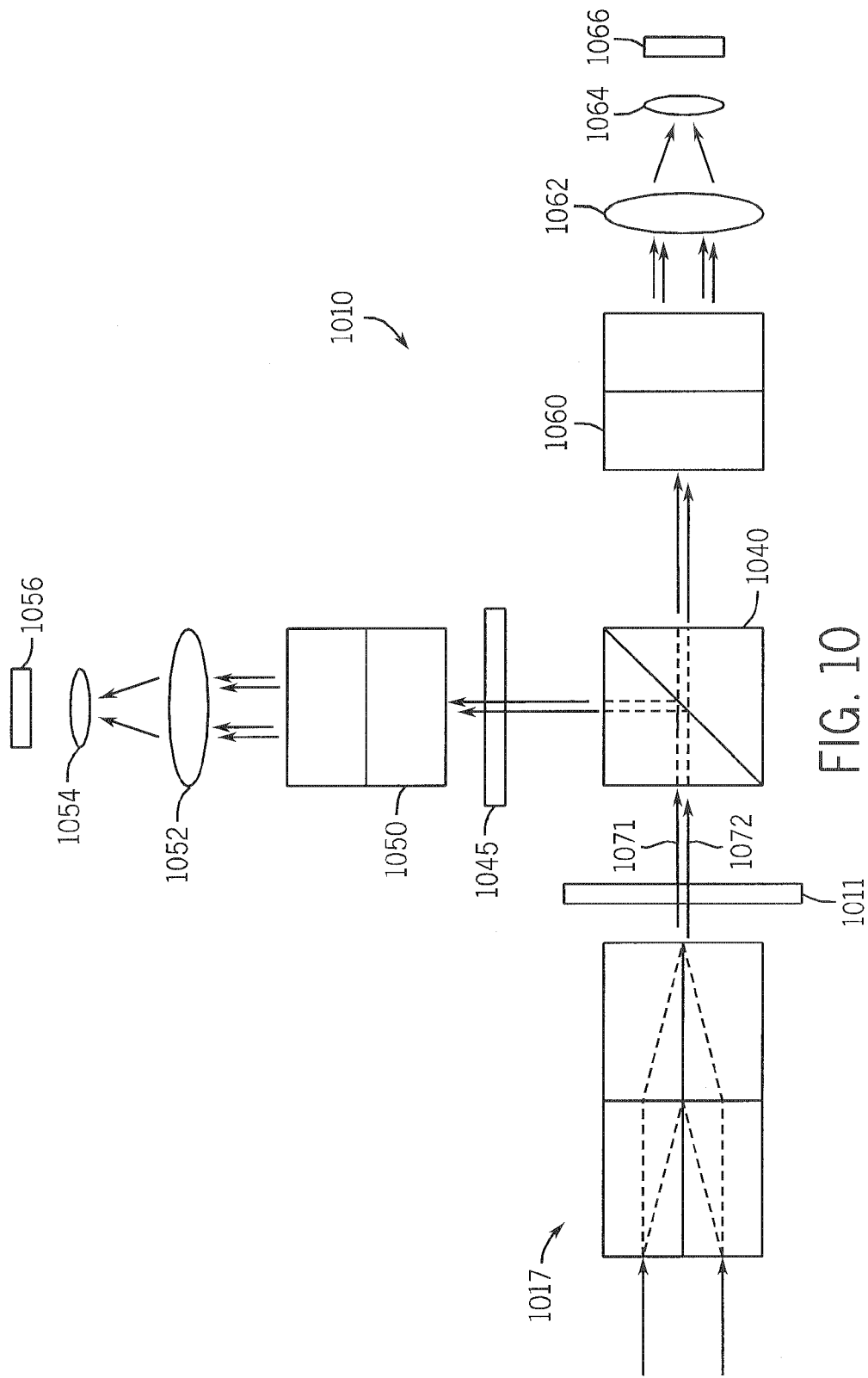
FIGS. 10, 11, 12A and 12B are coherent optical signal processing plan diagrams.

FIG. 10 shows an embodiment of a coherent optical signal processing system 1010 implementing a polarization combiner 1017 of the type shown in FIG. 9A. Two output beams 1071 and 1072 are split by NBS cube 1040. From that point on, system 1010 operates in a manner similar to the system 310 shown in FIGS. 3A, 3B and 3C, as will be appreciated by those skilled in the art. The PBS cube 317, tip plates 327 and mirrors 330 are all replaced by the polarization combiner 1017 alone, saving expense, simplifying design and operation, and reducing the need for additional and/or corrective adjustments at a later date. The polarization diagrams of FIGS. 4A-4R remain accurate portrayals of the polarization of the relevant beams, though these polarization diagrams assume the presence of a waveplate 1011 as depicted in FIG. 10. Other minor variations in these and other diagrammatic portrayals will be apparent to those skilled in the art.

Figure 11:
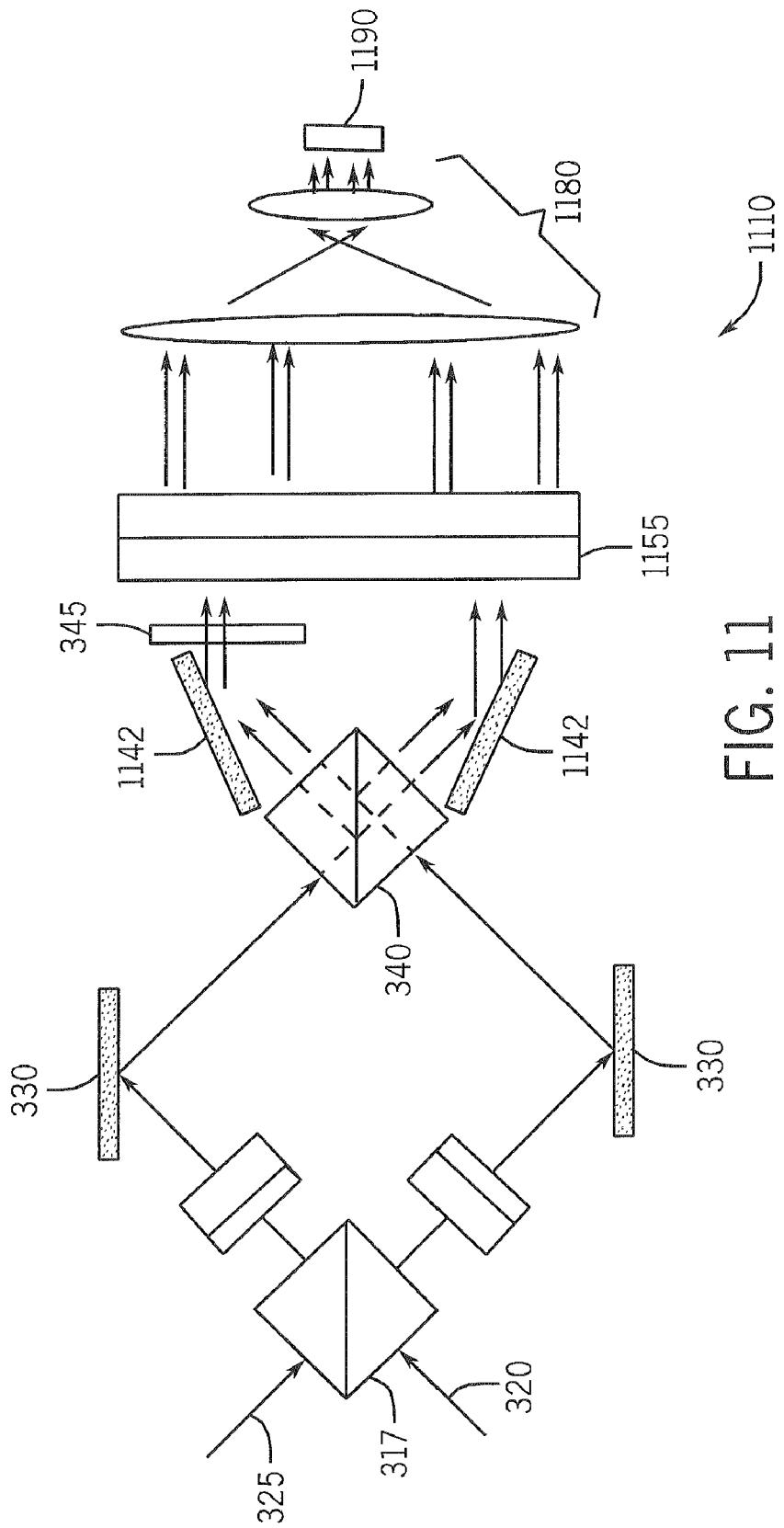

A further reduction in the number of system components is achieved by reflecting the outputs of the NBS cube into parallel paths so that Savart devices 1050 and 1060 of FIG. 10 can be combined into one Savart device 1155 of FIG. 11. This also allows use of one set of lenses 1180 so that all 8 detectors can be formed on a single photoreceiver chip 1190. FIG. 11 shows a first parallel output coherent optical signal processing system 1110. Components and operation are similar to the unit 310 of FIGS. 3A-3C, except that a pair of mirrors 1142 reflect the output beams of NBS cube 340 into an overall parallel orientation. Two beams still pass through waveplate 345, but the four beams 3811, 3812, 3821, 3822 encounter the same polarizing beam splitter prior to imaging by a single telescoping lens apparatus.

Figure 12A:
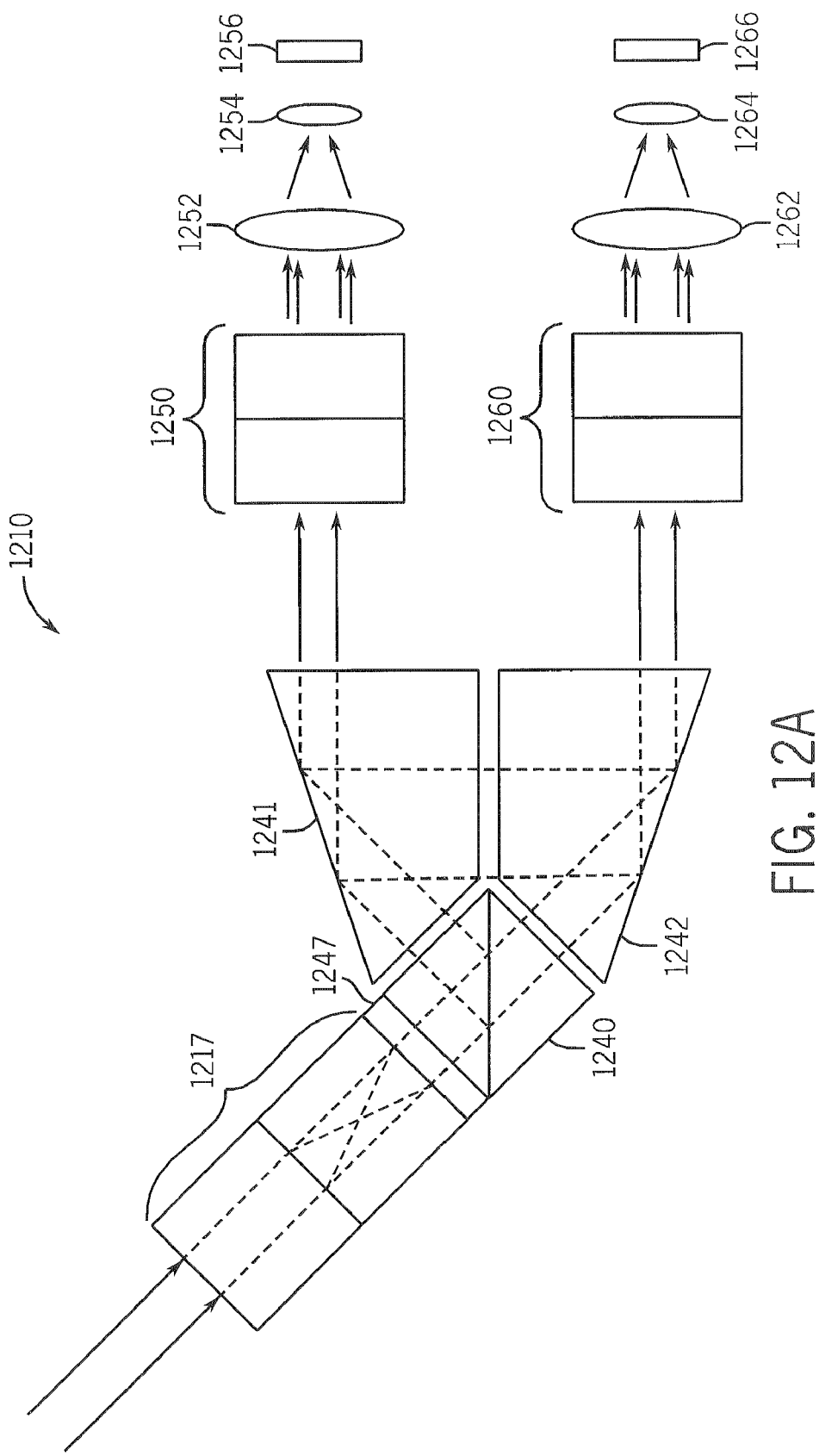

FIG. 12A shows another parallel output coherent optical signal processing unit 1210. A polarization combiner 1217 accepts input beams, generating and delivering two polarization-multiplexed beams through a waveplate 1247 to non-polarizing beam splitter 1240. The two non-reflected output beams of non-polarizing beam splitter 1240 are sent to a Savart device 1260 via a coated facet reflection unit 1242, at an angle of roughly 45° to the original input signal beam 1225 and local oscillator beam 1220. The beams exiting Savart device 1260 are imaged by telescope 1262, 1264 onto detector array 1266. The reflected beams of the NBS cube 1240 are sent to another Savart device 1250 via a TIR (total internal refection) unit 1241, also at an angle of approximately 45° to the unprocessed signal beam 1225 and local oscillator beam 1220. In addition to reflecting the beams entering Savart device 1250, the TIR unit also inserts a 90° phase shift between polarizations of the beams upon reflection. These phase shifted beams pass through the Savart device 1250 to a telescope/detector assembly 1252, 1254, 1256. The beams from Savart devices 1250, 1260 also can be imaged using a single telescope lens pair and/or a single photodetector array instead of pair 1256, 1266. Such variations in embodiments of the present invention are deemed equivalents of the embodiments specifically depicted in the Figures and described in detail herein.

Figure 12B:
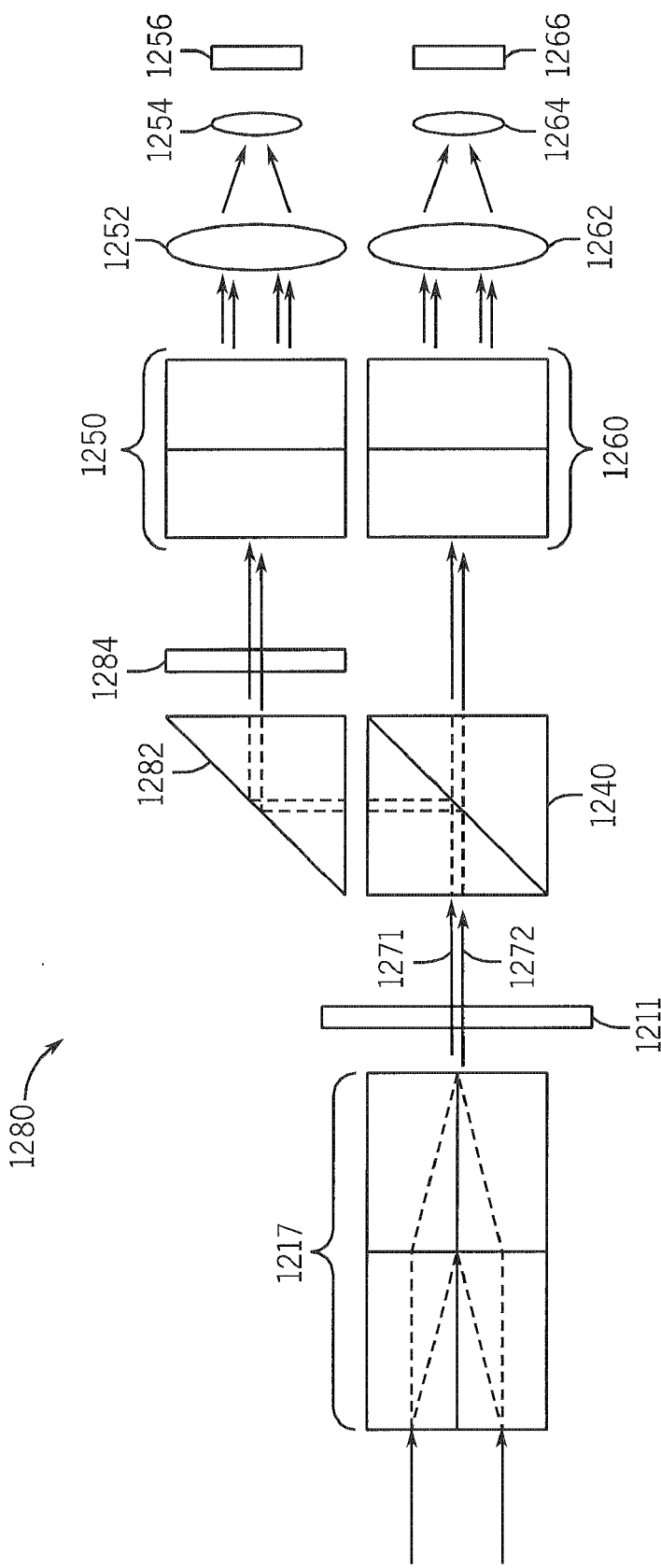

FIG. 12B shows another coherent optical signal processing system 1280. System 1280 is even "more linear" than the system 1210 of FIG. 12A. A 4 beam displacer 1217 accepts input beams, transmitting two polarization-multiplexed beams through will be apparent to those skilled in the art 1211 and then on to non-polarizing beam splitter 1240. Two of the output beams of non-polarizing beam splitter 1240 are sent to a Savart device 1260, more or less parallel to the original input signal beam 1217 and local oscillator beam 1220. The beams reflected out of non-polarizing beam splitter 1240 at approximately 90° to the unprocessed signal beam 1225 and local oscillator beam 1220 pass through a prism 1282 that does two things—first, it reflects the beams 90° to move them into a parallel orientation to the unprocessed signal beam 1225 and local oscillator beam 1220; and, second, it inserts a 90° phase shift between polarizations of the beams upon reflection, for example using a ¼ waveplate 1284. These phase shifted beams then pass through a Savart device 1250. The output beams of the Savart devices 1250, 1260 are treated similarly to those in FIG. 12A before reaching one or more photoreceivers.

Embodiments of the present invention provide a number of advantages over earlier systems, component, methods and the like. Many earlier systems required separate optical and detector assemblies, which necessitated coupling in and out of single-mode fiber. Such coupling resulted in a minimum of 0.2 dB of additional optical loss at each fiber interface due to difficulties with perfectly mode-matching and anti-reflection-coating of the fiber. In addition, each fiber coupling adds substantial cost due to the need to ruggedize each such connection. Cost is also multiplied when more high-frequency packages are required. A further disadvantage of separating the detector/receiver assembly from the optics is that matching is critical to obtaining the noise rejection provided by balanced detection. A 30 dB rejection ratio requires amplitude response matching to 3% and path length matching to <1% of the symbol period (<1 ps for 10 Gbaud). Such matching is nearly impossible with a separately packaged detector/receiver.

In embodiments of the present invention, excess optical loss is eliminated by incorporating the photodiodes into the optical assembly and removing the intervening fiber connection. Moreover, situating the photodiodes in the optical assembly results in an additional degree of freedom because the detectors need not be designed for fiber coupling. This allows many more detectors and amplifiers to be incorporated onto one chip. While direct coupling to single diodes has been used in earlier systems, there has not been any use of an integrated, "dual-balanced" photodiode quad or other array that provides two or more sets of integrated balanced photodiodes on the same chip. The difficulty with coupling to single diodes is that unless each diode is precisely placed to ~2-µm, each diode will require its own lens and mirror to direct the beam onto the diode, which prevents the benefits realized from the use of a single telescope lens pair to image all beams of a given Savart device or the like.

Figure 14:
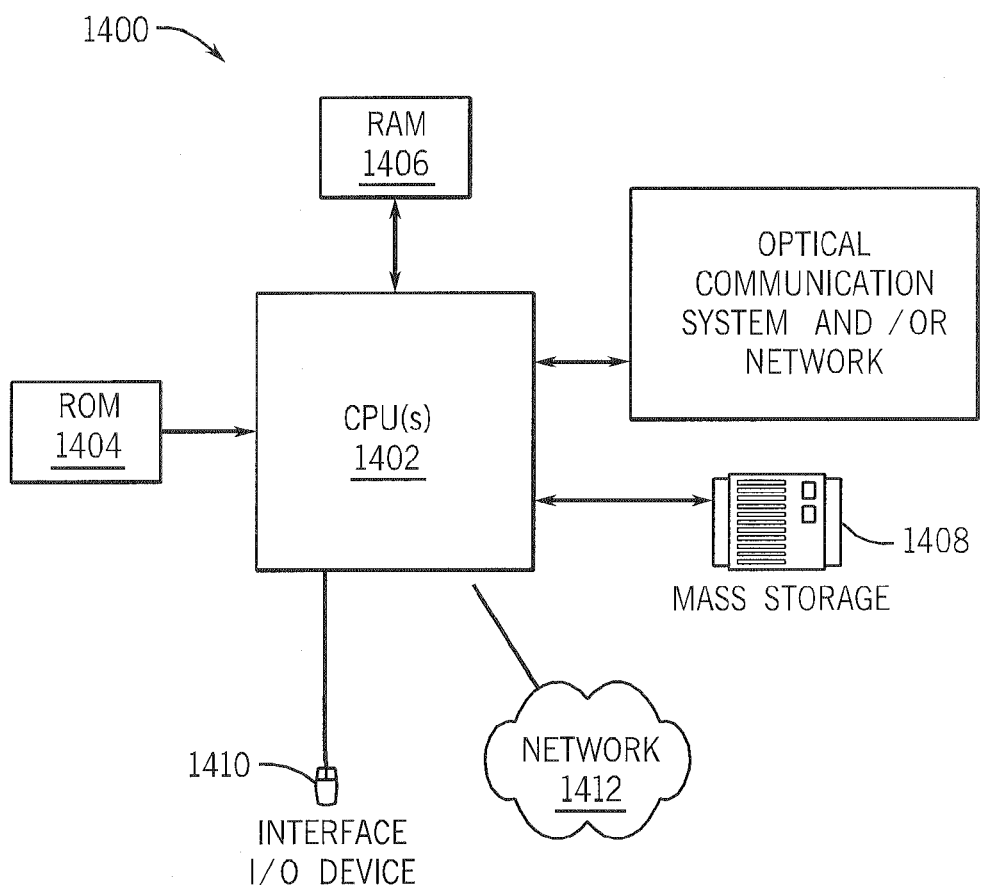
FIG. 14 is a block diagram of a typical computer system or integrated circuit system suitable for implementing embodiments of the present invention, including connection to one or more optical communications systems that can be used in connection with one or more embodiments of the present invention.

FIG. 14 illustrates a typical system that can be used as a coherent optical signal processor, diagnostic and/or testing equipment, and/or other component in a system in accordance with one or more embodiments of the present invention, for example for processing signals and/or data received from a photodetection apparatus or other source. Such a component can be a computer or the like used in connection with or as part of an optical signal receiver or an optical testing device. For example, system 1400 of FIG. 14 can execute software and perform other functions, consistent with discussions herein in connection with embodiments of the present invention above. The system 1400 includes any number of processors 1402 (also referred to as central processing units, or CPUs) that are coupled to storage devices including storage 1406 (typically a random access memory, or RAM), storage 1404 (typically a read only memory, or ROM). The processor(s) 1402 can run one or more operating systems that are well known in the art. As is also well known in the art, storage 1404 acts to transfer data and instructions uni-directionally to the CPU and storage 1406 is used typically to transfer data and instructions in a bi-directional manner. Both of these storage devices may include any suitable of the computer-readable media, other computer program products and the like. A mass storage device 1408 also is coupled bi-directionally to CPU 1402 and provides additional data storage capacity and may include one or more of the computer-readable media, other computer program products and the like. The mass storage device 1408 may be used to store programs, data and the like and is typically a secondary storage medium such as a hard disk. It will be appreciated that the information retained within the mass storage device 1408, may, in appropriate cases, be incorporated in standard fashion as part of primary storage 1406 as virtual memory. A specific mass storage device such as a CD-ROM may also pass data uni-directionally to the CPU.

Exemplary CPU 1402 also is coupled to an interface 1410 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Moreover, CPU 1402 optionally may be coupled to a computer or telecommunications network using a network connection as shown generally at 1412. With such a network connection, it is contemplated that the CPU might receive information from the network, or might output information to the network in the course of performing described method steps, for example where a network base station is in use. Finally, CPU 1402, when it is part of a host computer or the like, may be coupled to a bridge device 1420 according to one or more embodiments of the present invention and is used to access one or more target devices 1430. The above-described devices and materials will be familiar to those of skill in the computer hardware and software arts. The hardware elements described above may define multiple software modules for performing the operations of this invention. For example, instructions for running a data encryption cracking program, password breaking program, etc. may be stored on mass storage device 1408 and executed on CPU 1402 in conjunction with primary memory 1406.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A coherent optical signal processor comprising:
   means for polarization multiplexing a local oscillator (LO) beam and an unprocessed signal beam comprising:
      a first birefringent crystal configured to split the LO beam into an LO beam e-ray and an LO beam o-ray;
      a second birefringent crystal adjacent to the first birefringent crystal and configured to split the unprocessed signal beam into a unprocessed signal beam e-ray and a unprocessed signal beam o-ray;
      wherein the LO beam e-ray, the LO beam o-ray, the unprocessed signal beam e-ray and the unprocessed signal beam o-ray generally form a square upon exiting the first and second birefringent crystals;
      a third birefringent crystal configured to combine the LO beam e-ray and the unprocessed signal beam o-ray into a first multiplexed output beam; and
      a fourth birefringent crystal adjacent to the third birefringent crystal and configured to combine the LO beam o-ray and the unprocessed signal beam e-ray into a second multiplexed output beam;
   means for generating a plurality of differential detection beams comprising first and second Savart devices, wherein each Savart device comprises:
      a first birefringent plate; and
      a second birefringent plate adjacent the first birefringent plate;
      wherein the first birefringent plate has first and second polarization axes and is configured to:
         receive the first multiplexed output beam;
         transmit first and second analyzed beams, wherein the first analyzed beam is a sum of the projections of the unprocessed signal beam o-ray and the LO beam e-ray onto the first polarization axis of the first birefringent plate, and further wherein the second analyzed beam is a sum of the projections of the unprocessed signal beam o-ray and the LO beam e-ray onto the second polarization axis of the first birefringent plate; and
         displace the first analyzed beam with respect to the first multiplexed output beam;
         receive the second multiplexed output beam;
         transmit third and fourth analyzed beams, wherein the third analyzed beam is a sum of the projections of the unprocessed signal beam e-ray and the LO beam o-ray onto the first polarization axis of the first birefringent plate, and further wherein the fourth analyzed beam is a sum of the projections of the unprocessed signal beam e-ray and the LO beam o-ray onto the second polarization axis of the first birefringent plate; and
         displace the third analyzed beam with respect to the second multiplexed output beam; and
      wherein the second birefringent plate is configured to displace the second analyzed beam with respect to the first analyzed beam and further wherein the second birefringent plate is configured to displace the fourth analyzed beam with respect to the third analyzed beam;
   a waveplate between the first Savart device and the polarization combiner, wherein the waveplate is configured to shift the phase of the local oscillator beam by 90° with respect to the unprocessed signal beam; and
   photodetection apparatus comprising:
      a substrate; and
      a 2-dimensional photodiode array mounted to the substrate, the photodiode array comprising a plurality of balanced photodiode pairs;
      wherein the photodiode pairs are spaced apart perpendicularly by a distance not exceeding 250 µm.

2. The coherent optical signal processor of claim 1 wherein the LO beam, the unprocessed signal beam, the first multiplexed output beam and the second multiplexed output beam are all generally parallel to one another.

3. The coherent optical signal processor of claim 2 wherein the birefringent crystals all are made of either calcite or vanadate.

4. The coherent optical signal processor of claim 1 further comprising a two-fiber input collimator configured to supply the LO beam to the first birefringent crystal and further configured to supply the unprocessed signal beam to the second birefringent crystal.

5. The coherent optical signal processor of claim 1 wherein the first and second birefringent plates are configured to displace the first and second analyzed beams so that the first and second analyzed beams have equidistant paths through each Savart device.

6. The coherent optical signal processor of claim 5 wherein the birefringent plates are made of one of the following: calcite; calomel; rutile; lithium niobate; or vanadate.

7. The coherent optical signal processor of claim 1 wherein the photodetection apparatus further comprises a telescope comprising first and second lenses, the telescope being configured to receive the first, second, third and fourth analyzed beams and to image the first, second, third and fourth analyzed beams onto the plurality of photodetector pairs.

8. The coherent optical signal processor of claim 1 wherein the photodiodes in each photodiode pair are spaced apart by a distance based on the bandwidth at which the photodetection apparatus operates; and
   further wherein the photodiode pairs are spaced apart by a distance based on the bandwidth at which the photodetection apparatus operates.

9. A coherent optical signal processor comprising:
   a polarization combiner for polarization-multiplexing a first input beam and a second input beam to generate and transmit a first pair of polarization-multiplexed output beams comprising a first polarization-multiplexed output beam and a second polarization-multiplexed output beam, the polarization combiner comprising:
      an input plate pair comprising a first birefringent plate and a second birefringent plate;
      an output plate pair comprising a third birefringent plate and a fourth birefringent plate;
      wherein the first birefringent plate is configured to receive the first input beam and is further configured to transmit an o-ray of the first input beam and to transmit an e-ray of the first input beam;
      wherein the second birefringent plate is configured to receive the second input beam and is further configured to transmit an o-ray of the second input beam and to transmit an e-ray of the second input beam;

wherein the third birefringent plate is configured to receive the first input beam o-ray and the second input beam e-ray and is further configured to transmit the first polarization-multiplexed output beam comprising the first input beam o-ray and the second input beam e-ray;

wherein the fourth birefringent plate is configured to receive the first input beam e-ray and the second input beam o-ray and is further configured to transmit the second polarization-multiplexed output beam comprising the first input beam e-ray and the second input beam o-ray;

a beam splitter configured to receive the first and second polarization-multiplexed output beams and to generate and transmit generally identical copies of each polarization-multiplexed output beam, the output beam copies comprising a first copy pair and a second copy pair;

a Savart device configured to receive the first copy pair transmitted by the beam splitter to generate and transmit a first differential detection beam, a second differential detection beam, a third differential detection beam and a fourth differential detection beam, the Savart device comprising:

a symmetrical walkoff assembly comprising first and second birefringent crystals, wherein the symmetrical walkoff assembly has a first walkoff axis and has a second walkoff axis orthogonal to the first walkoff axis;

wherein the first polarization-multiplexed output beam comprises horizontal and vertical polarization components;

further wherein the second polarization-multiplexed output beam comprises horizontal and vertical polarization components;

further wherein the first and second walkoff axes are angularly offset approximately 45° from the horizontal and vertical polarization components of the first and second polarization-multiplexed output beams; and photodetection apparatus comprising a plurality of photodiodes configured to receive the first differential detection beam, the second differential detection beam, the third differential detection beam and the fourth differential detection beam.

10. The coherent optical signal processor of claim 9 wherein the Savart device is further configured to receive and process a phase-shifted copy pair, wherein the phase-shifted copy pair comprises the second copy pair transmitted by the beam splitter after passing through a waveplate interposed between the Savart device and the polarization combiner, wherein the waveplate is configured to shift the relative phase of the second copy pair by 90°.

11. The coherent optical signal processor of claim 9 wherein the first input beam, the second input beam, the first polarization-multiplexed output beam and the second polarization-multiplexed output beam all are parallel to one another.

12. The coherent optical signal processor of claim 9 wherein the first, second, third and fourth birefringent plates each have an anti-reflective coating and are made of at least one of the following: calcite; calomel; rutile; lithium niobate; or vanadate.

13. The coherent optical signal processor of claim 12 wherein the cut and optical axis of each birefringent plate are configured to maximize the displacement of the e-ray and o-ray of each birefringent plate.

14. The coherent optical signal processor claim 9 wherein the first and second birefringent plates are mounted adjacent to one another and oriented at a 45° angle so that the first input beam received by the first birefringent plate input and the second input beam received by the second birefringent plate are generally horizontally displaced from one another and further wherein the third and fourth birefringent plates are mounted adjacent to one another and oriented at a 45° so that the first and second polarization-multiplexed output beams are generally vertically displaced from one another.

15. The coherent optical signal processor of claim 9 further comprising a collimator configured to generate first and second collimator output beams, wherein the first and second collimator output beams are the first and second input beams, respectively.

16. The coherent optical signal processor of claim 9 wherein the photodetection apparatus comprises a substrate onto which the plurality of photodiodes are mounted as a 2-dimensional array of photodiode pairs, further wherein the photodiode pairs are spaced apart perpendicularly by a distance not exceeding 250 µm.

17. The coherent optical signal processor of claim 16 wherein the photodiodes in each photodiode pair are spaced apart by a spacing less than 80 µm.

* * * * *